US009099868B2

(12) United States Patent
Taft

(10) Patent No.: US 9,099,868 B2
(45) Date of Patent: Aug. 4, 2015

(54) CONTROL FEDERATION FOR UTILITY GRIDS

(75) Inventor: Jeffrey D. Taft, Washington, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/484,066

(22) Filed: May 30, 2012

(65) Prior Publication Data

US 2012/0310424 A1 Dec. 6, 2012

Related U.S. Application Data

(60) Provisional application No. 61/491,377, filed on May 31, 2011.

(51) Int. Cl.
*H02J 3/00* (2006.01)

(52) U.S. Cl.
CPC ........................................ *H02J 3/00* (2013.01)

(58) Field of Classification Search
CPC ............ G05B 13/02; G06F 1/26; G06F 9/50; G06F 9/4881; G06F 9/5077; G06F 11/3495; H02J 3/14
USPC .................... 700/286, 297; 709/224; 718/104
See application file for complete search history.

(56) References Cited

U.S. PATENT DOCUMENTS

| 6,281,601 | B1 | 8/2001 | Edelman et al. |
| 8,451,744 | B2 | 5/2013 | Vasseur |
| 2003/0204756 | A1 | 10/2003 | Ransom et al. |
| 2004/0064548 | A1 | 4/2004 | Adams et al. |
| 2005/0155033 | A1* | 7/2005 | Luoffo et al. ................ 718/104 |
| 2006/0038672 | A1 | 2/2006 | Schoettle |
| 2007/0206644 | A1 | 9/2007 | Bertsch et al. |
| 2009/0204368 | A1 | 8/2009 | Bickel |
| 2009/0281674 | A1 | 11/2009 | Taft |
| 2009/0281679 | A1* | 11/2009 | Taft et al. ...................... 700/297 |
| 2009/0326731 | A1* | 12/2009 | Bowdry et al. ............... 700/297 |
| 2010/0072817 | A1* | 3/2010 | Hirst ............................... 307/31 |

(Continued)

FOREIGN PATENT DOCUMENTS

| CN | 201742093 U | 2/2011 |
| JP | 2009159808 A | 7/2009 |

OTHER PUBLICATIONS

Taft, J., "Variable Topology Distributed Intelligence for Smart Grids", U.S. Appl. No. 61/491,377, filed May 31, 2011, 13 pages.

(Continued)

*Primary Examiner* — Robert Fennema
*Assistant Examiner* — Anthony Whittington
(74) *Attorney, Agent, or Firm* — Parker Ibrahim & Berg LLC; James M. Behmke; Kenneth J. Heywood

(57) ABSTRACT

In one embodiment, a federation device receives one or more grid control-based signals over a computer network, applies one or more utility grid control policies to the one or more grid control-based signals, and federates the one or more signals and/or the one or more utility grid control policies into one or more federated control-based signals. The federation device then propagates the one or more federated control-based signals to one or more grid-related devices.

20 Claims, 29 Drawing Sheets

(56) References Cited

U.S. PATENT DOCUMENTS

| | | | |
|---|---|---|---|
| 2010/0100250 A1* | 4/2010 | Budhraja et al. | 700/291 |
| 2010/0179862 A1 | 7/2010 | Chassin et al. | |
| 2011/0106321 A1* | 5/2011 | Cherian et al. | 700/286 |
| 2011/0275364 A1 | 11/2011 | Austin et al. | |
| 2011/0282508 A1 | 11/2011 | Goutard et al. | |
| 2012/0029720 A1* | 2/2012 | Cherian et al. | 700/297 |
| 2012/0039186 A1 | 2/2012 | Vasseur | |
| 2012/0155557 A1 | 6/2012 | Bush et al. | |
| 2013/0054044 A1 | 2/2013 | Shaffer et al. | |

OTHER PUBLICATIONS

Kellner, et al., "Notification of Transmittal of the International Search Report and the Written Opinion of the International Searching Authority, or the Declaration", Patent Cooperation Treaty, Dec. 4, 2012, 9 pages, PCT/US2012/040148, European Patent Office, Rijswijk, Netherlands.

Kellner, et al., "Notification of Transmittal of the International Search Report and the Written Opinion of the International Searching Authority, or the Declaration", Patent Cooperation Treaty, Dec. 18, 2012, 9 pages, PCT/US2012/040141, European Patent Office, Rijswijk, Netherlands.

* cited by examiner

TABLE 400: ISSUES FOR SMART GRID AT SCALE

| ISSUE | COMMENT |
|---|---|
| ULS CHARACTERISTICS OF SMART GRIDS AT SCALE | • DECENTRALIZED CONTROL<br>• INHERENTLY CONFLICTING DIVERSE REQUIREMENTS<br>• CONTINUOUS EVOLUTION AND DEPLOYMENT<br>• HETEROGENEOUS, INCONSISTENT, AND CHANGING ELEMENTS<br>• NORMAL FAILURES |
| HIDDEN COUPLING VIA THE GRID | SYSTEMS AND CONTROLS ARE INHERENTLY COUPLED THROUGH GRID ELECTRICAL PHYSICS AND THEREFORE INTERACT IN WAYS THAT MAY BE UNACCOUNTED FOR IN EXISTING SYSTEM DESIGNS |
| GRID AS A MULTI-OBJECTIVE, MULTI-CONTROL SYSTEM | MULTIPLE CONTROLS AFFECTING THE SAME GRID PORTIONS; SOME OF THE CONTROLS LIE OUTSIDE OF THE UTILITY; CONTROLS OPERATING ON MULTIPLE TIME SCALES (SEE ALSO LATENCY HIERARCHY BELOW) |
| LOCALITY OF CONTROL | BULK OR AGGREGATE CONTROL COMMANDS, ESPECIALLY AS REGARDS SECONDARY LOAD CONTROL AND STABILIZATION, ARE NOT CURRENTLY BROKEN DOWN TO THE FEEDER OR EVEN SECTION LEVEL, TAKING INTO ACCOUNT GRID STATE AT THE RESPECTIVE LEVEL |
| LATENCY HIERARCHY | SMART GRID-GENERATED DATA MUST BE USED ON ANY OF A NUMBER OF LATENCY SCALES, SOME OF WHICH ARE QUITE SHORT, THUS PRECLUDING PURELY CENTRALIZED PROCESSING AND CONTROL APPROACHES |

FIG. 4

| DATA LIFESPAN CLASS | CHARACTERISTICS |
|---|---|
| TRANSIT | DATA EXISTS FOR ONLY THE TIME NECESSARY TO TRAVEL FROM SOURCE TO SINK AND BE USED; IT PERSISTS ONLY MOMENTARILY IN THE NETWORK AND THE DATA SINK AND IS THEN DISCARDED; EXAMPLES ARE AN EVENT MESSAGE USED BY PROTECTION RELAYS, AND SENSOR DATA USED IN CLOSED LOOP CONTROLS; PERSISTENCE TIME MAY BE MICROSECONDS |
| BURST/FLOW | DATA THAT IS PRODUCED IN BURSTS OR IS PROCESSED IN BURSTS MAY EXIST TEMPORARILY IN FIFO QUEUES OR CIRCULAR BUFFERS UNTIL IT IS CONSUMED OR OVERWRITTEN; EXAMPLES INCLUDE TELEMETRY DATA AND ASYNCHRONOUS EVENT MESSAGES (ASSUMING THEY ARE NOT LOGGED) - OFTEN THE STORAGE FOR THESE DATA ARE INCORPORATED DIRECTLY INTO APPLICATIONS, E.G. CEP ENGINE EVENT BUFFERS |
| OPERATIONAL | DATA THAT MAY BE USED FROM MOMENT TO MOMENT BUT IS CONTINUALLY UPDATED WITH REFRESHED VALUES SO THAT OLD VALUES ARE OVERWRITTEN SINCE ONLY PRESENT (FRESH) VALUES ARE NEEDED; EXAMPLE: GRID (POWER) STATE DATA SUCH AS SCADA DATA THAT MAY BE UPDATED EVERY FEW SECONDS |
| TRANSACTIONAL | DATA THAT EXISTS FOR AN EXTENDED BUT NOT INDEFINITE TIME; TYPICALLY USED IN TRANSACTION PROCESSING AND BUSINESS INTELLIGENCE APPLICATIONS; STORAGE MAY BE IN DATABASES INCORPORATED INTO APPLICATIONS OR IN DATA WAREHOUSES, DATAMARTS OR BUSINESS DATA REPOSITORIES |
| ARCHIVAL | DATA THAT MUST BE SAVED FOR VERY LONG (EVEN INDEFINITE) TIME PERIODS; INCLUDES METER USAGE DATA (E.G. SEVEN YEARS), PMU DATA AT ISO/RTO'S (SEVERAL YEARS); LOG FILES. NOTE THAT SOME DATA MAY BE RETAINED IN MULTIPLE COPIES; FOR EXAMPLE, ISO'S MUST RETAIN PMU DATA IN QUADRUPLICATE. |

FIG. 8

INDIRECT
DEPENDENT
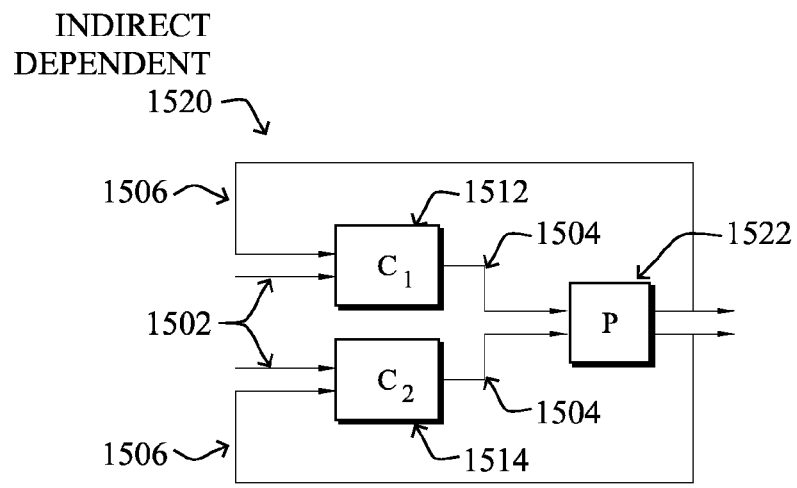
SUBORDINAL DEPENDENCY
(CASCADED CONTROLLERS)
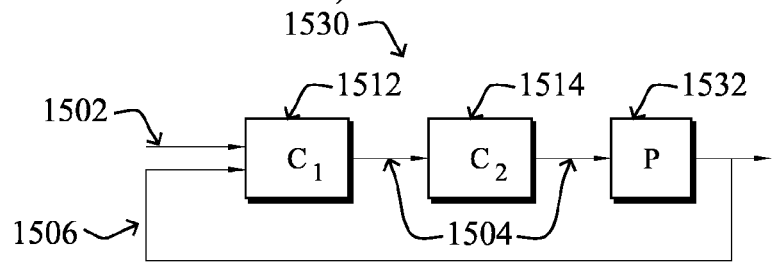
HARD CONDITIONAL
DEPENDENCY
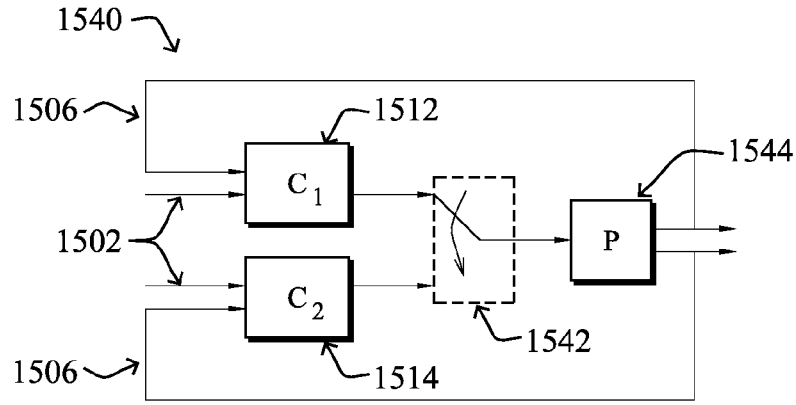
FIG. 15A SOFT CONDITIONAL
DEPENDENCY
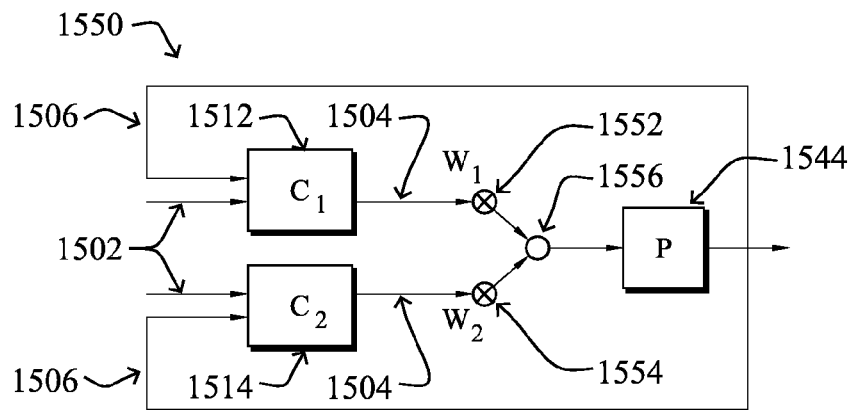
INDEPENDENT
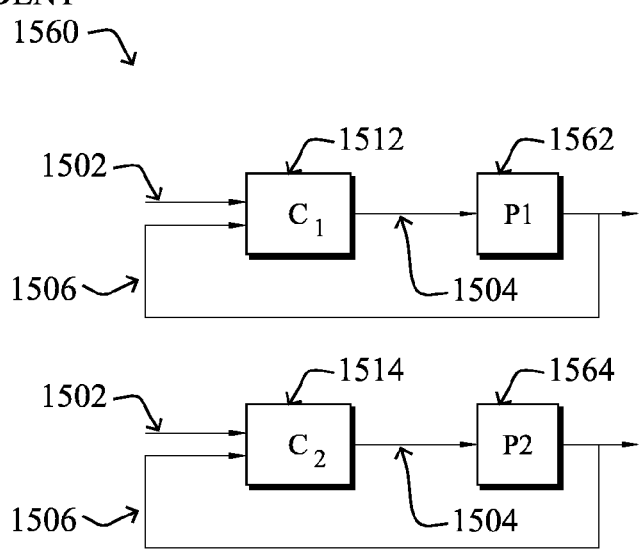
FIG. 15B

CONTROL FEDERATION FOR UTILITY GRIDS

RELATED APPLICATIONS

The present application claims priority to U.S. Provisional Application No. 61/491,377, filed May 31, 2011, entitled VARIABLE TOPOLOGY DISTRIBUTED INTELLIGENCE FOR SMART GRIDS, by Jeffrey D. Taft, the contents of which are hereby incorporated by reference.

TECHNICAL FIELD

The present disclosure relates generally to utility control systems, e.g., to "smart grid" technologies.

BACKGROUND

Utility control systems and data processing systems have largely been centralized in nature. Energy Management Systems (EMSs), Distribution Management Systems (DMSs), and Supervisory Control and Data Acquisition (SCADA) systems reside in control or operations centers and rely upon what have generally been low complexity communications to field devices and systems. There are a few distributed control systems for utility applications, including a wireless mesh system for performing fault isolation using peer-to-peer communications among devices on feeder circuits outside of the substations. In addition, certain protection schemes involve substation-to-substation communication and local processing. In general however, centralized systems are the primary control architecture for electric grids.

Moreover, grid control operations are multi-objective, multi-controller (MO/MC) systems that frequently encounter situations in which more than one system controller attempts to control the same device/system for conflicting purposes, which requires conflict resolution and is inefficient.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example table showing challenges associated with complexity for smart grids at scale;

FIG. 8 illustrates an example table of data lifespan classes;

FIGS. 15A-15B illustrate examples of grid control designs;

DESCRIPTION OF EXAMPLE EMBODIMENTS

Overview

According to one or more embodiments of the disclosure, a federation device receives one or more grid control-based signals over a computer network, applies one or more utility grid control policies to the one or more grid control-based signals, and federates the one or more signals and/or the one or more utility grid control policies into one or more federated control-based signals. The federation device then propagates the one or more federated control-based signals to one or more grid-related devices.

Description

Electric power is generally transmitted from generation plants to end users (industries, corporations, homeowners, etc.) via a transmission and distribution grid consisting of a network of interconnected power stations, transmission circuits, distribution circuits, and substations. Once at the end users, electricity can be used to power any number of devices. Generally, various capabilities are needed to operate power grids at the transmission and distribution levels, such as protection, control (flow control, regulation, stabilization, synchronization), usage metering, asset monitoring and optimization, system performance and management, etc.

Figure 1:
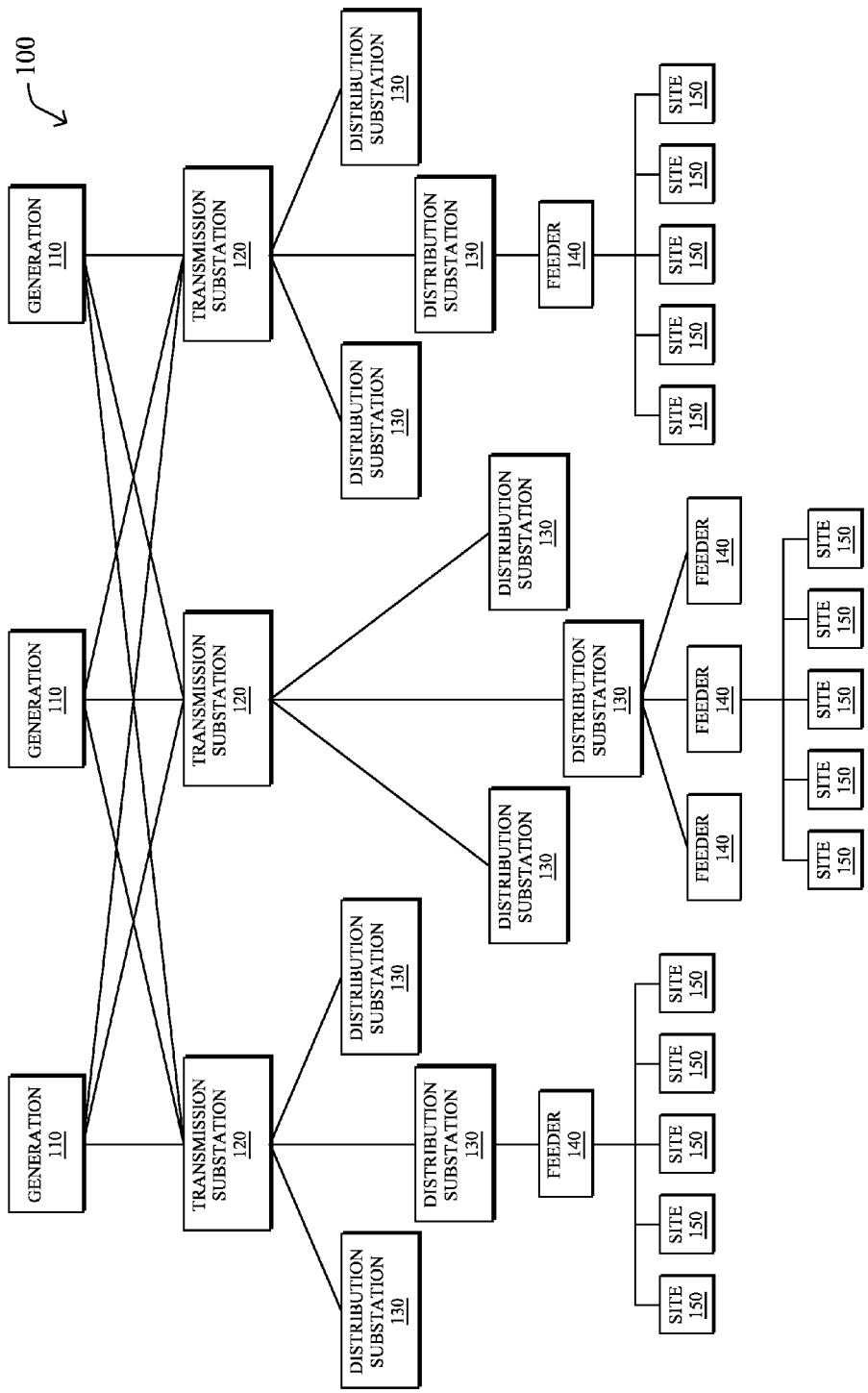
FIG. 1 illustrates an example simplified utility grid hierarchy.

FIG. 1 illustrates an example simplified utility grid and an example physical hierarchy of electric power distribution. In particular, energy may be generated at one or more generation facilities 110 (e.g., coal plants, nuclear plants, hydro-electric plants, wind farms, etc.) and transmitted to one or more transmission substations 120. From the transmission substations 120, the energy is next propagated to distribution substations 130 to be distributed to various feeder circuits (e.g., transformers) 140. The feeders 140 may thus "feed" a variety of end-point "sites" 150, such as homes, buildings, factories, etc. over corresponding power-lines.

Note that the illustrative structure of the utility grid is shown as a highly simplified hierarchy, e.g., a hierarchy with generation at the top, transmission substations as the next tier, distribution substation as the next, etc. However, those skilled in the art will appreciate that FIG. 1 is merely an illustration for the sake of discussion, and actual utility grids may operate in a vastly more complicated manner (e.g., even in a vertically integrated utility). That is, FIG. 1 illustrates an example of power-based hierarchy (i.e., power starts at the generation level, and eventually reaches the end-sites), and not a logical control-based hierarchy. In particular, in conventional environments, transmission and primary distribution substations are at the same logical level, while generation is often its own tier and is really controlled via automatic generation control (AGC) by a Balancing Authority or other Qualified Scheduling Entity, whereas transmission lines and substations are under the control of a transmission operator Energy Management System (EMS). Primary distribution substations may be controlled by a transmission EMS in some cases and are controlled by a distribution control center, such as when distribution is via a Distribution System Operator (DSO). (Generally, distribution feeders do logically belong to primary distribution substations as shown.)

In the case of distributed control, that is, in terms of control-based hierarchy, substations may be grouped so that some are logically higher level than others. In this manner, the need to put fully duplicated capabilities into each substation may be avoided by allocating capabilities so as to impose a logical control hierarchy onto an otherwise flat architecture, such as according to the techniques described herein. In such cases, transmission substations may be grouped and layered, while primary distribution substations may be separately grouped and layered, but notably it is not necessary (or even possible) that distribution substations be logically grouped under transmission substations.

In general, utility companies can benefit from having accurate distribution feeder (medium voltage/low voltage or "MV/LV" circuit) connectivity information in their software applications and data stores. This is especially useful for outage management and for convenient application to planning, construction, operations, and maintenance. It is, however, very challenging to try to construct or approximate the circuit model within a geographic information systems (GIS) environment due to the complexity of modeling the dynamic nature of an electrical network. That is, while the utility may have an "as-built" database, it may differ from the actual grid for various reasons, including inaccurate or incomplete data capture on grid construction, changes to circuits that are not reflected in updates to the database, and structural damage to the grid. In addition, circuit topology may change dynamically as feeder switches are operated in the course of either normal or emergency operations. Such changes result in an "as-operated" topology that is dynamic and is not reflected in the "as-built" database.

To assist in control of the utility grid, various measurement and control devices may be used at different locations within the grid 100. Such devices may comprise various energy-directing devices, such as reclosers, power switches, circuit breakers, etc. In addition, other types of devices, such as sensors (voltage sensors, current sensors, temperature sensors, etc.) or computational devices, may also be used. Electric utilities use alternating-current (AC) power systems extensively in generation, transmission, and distribution. Most of the systems and devices at the high and medium voltage levels operate on three-phase power, where voltages and currents are grouped in threes, with the waveforms staggered evenly. The basic mathematical object that describes an AC power system waveform (current of voltage) is the "phasor" (phase angle vector). Computational devices known as Phasor Measurement Units (PMUs) have thus been commercialized by several companies to calculate phasors from power waveforms. Because phase angle is a relative quantity, it is necessary when combining phasors taken from different parts of a power grid to align the phase angle elements to a common phase reference; this has been typically done in PMUs through the use of GPS timing signals. Such phasors are known as synchrophasors.

Figure 2:
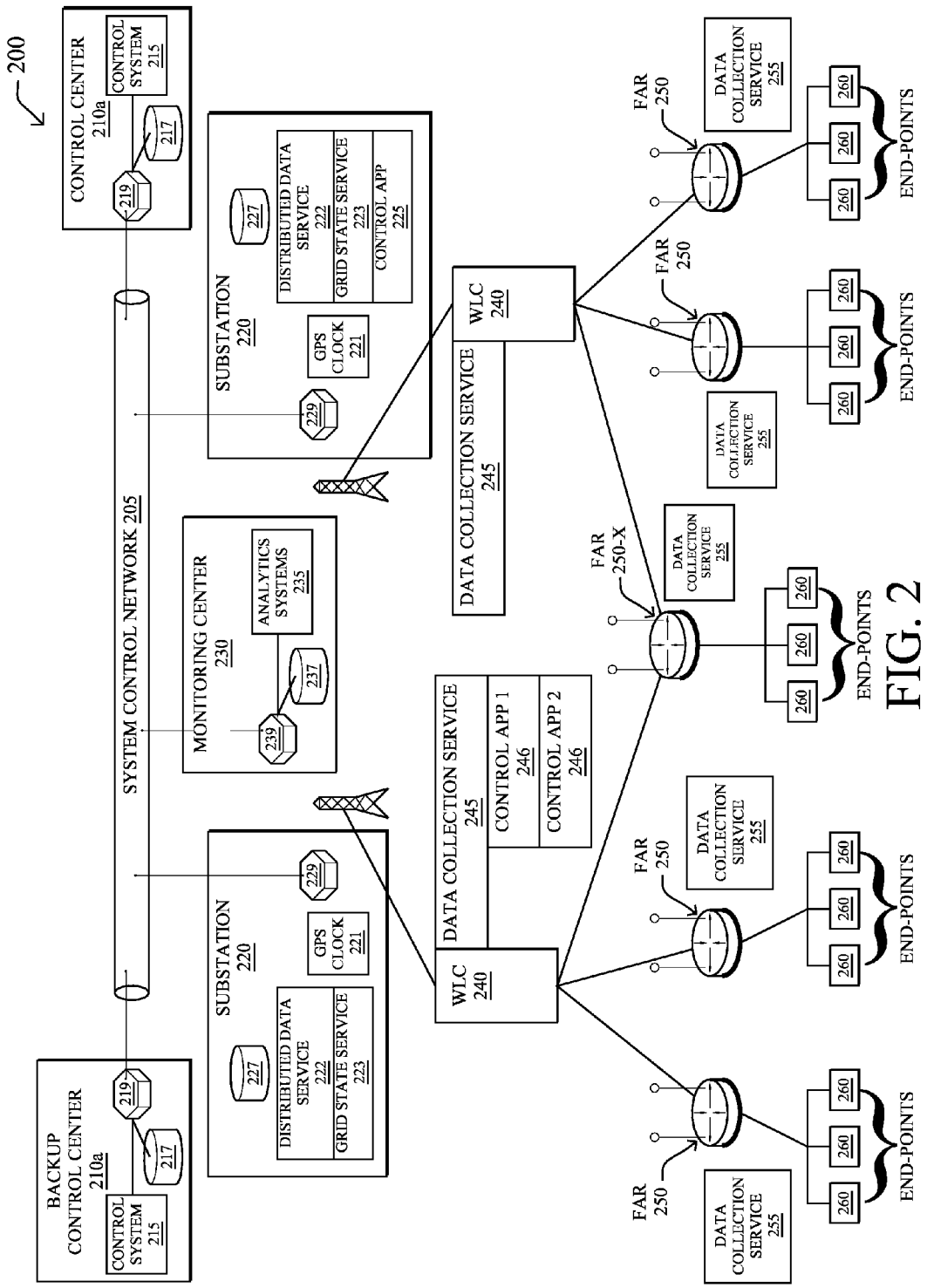
FIG. 2 illustrates an example simplified communication network based on a utility grid (e.g., a "smart grid" network)

FIG. 2 is a schematic block diagram of a communication network 200 that may illustratively be considered as an example utility grid communication network. The network 200 illustratively comprises nodes/devices interconnected by various methods of communication, such as wired links or shared media (e.g., wireless links, Power-line communication (PLC) links, etc.), where certain devices, such as, e.g., routers, sensors, computers, etc., may be in communication with other devices, e.g., based on distance, signal strength, current operational status, location, etc. Those skilled in the art will understand that any number of nodes, devices, links, etc. may be used in the computer network, and that the view shown herein is for simplicity. Data packets may be exchanged among the nodes/devices of the computer network 200 using predefined network communication protocols such as certain known wired protocols, wireless protocols (e.g., IEEE Std. 802.15.4, WiFi, Bluetooth®, DNP3 (distributed network protocol), Modbus, IEC 61850, etc.), PLC protocols, or other protocols where appropriate. In this context, a protocol consists of a set of rules defining how the nodes interact with each other.

Illustratively, a control center 210 (and backup control center 210a) may comprise various control system processes 215 and databases 217 interconnected via a network switch 219 to a system control network 205. Additionally, one or more substations 220 may be connected to the control network 205 via switches 229, and may support various services/process, such as a distributed data service 222, grid state service (e.g., "parstate", a determination of part of the whole grid state) 223, control applications 225, etc. The substations 220 may also have a GPS clock 221 to provide timing, which may be distributed to the FARs 250 (below) using IEEE Std. 1588. Note that a monitoring center 230 may also be in communication with the network 205 via a switch 239, and may comprise various analytics systems 235 and databases 237. The substations 220 may communicate with various other substations (e.g., from transmission substations to distribution substations, as mentioned above) through various methods of communication. For instance, a hierarchy of wireless LAN controllers (WLCs) 240 and field area routers (FARs) 250 may provide for specific locality-based communication between various portions of the underlying utility grid 100 in FIG. 1. WLCs 240 (which may also be considered as a type of higher grid level FAR) may comprise various services, such as data collection 245, control applications 246, etc. Generally, grid devices on shared feeder sections (e.g., FAR 250-X) may communicate with both involved substations (e.g., both WLCs 240, as shown). Further, FARs 250 may also comprise data collection services 255 themselves, and may collect data from (or distribute data to) one or more end-point communication devices 260, such as sensors and/or actuators (e.g., home energy controllers, grid controllers, etc.).

Specific details of the operation of the smart grid devices are described below. Note that while there is a general correlation between the communication network 200 and underlying utility grid 100 (e.g., control centers, substations, endpoints, etc.), such a correlation may only be generally assumed, and is not a necessity. For instance, FARs 250 may be associated with feeder circuits 140, or may be more granular such as, e.g., "pole-top" routers. In other words, the hierarchies shown in FIG. 1 and FIG. 2 are not meant to be specifically correlated, and are merely examples of hierarchies for illustration.

Figure 3:
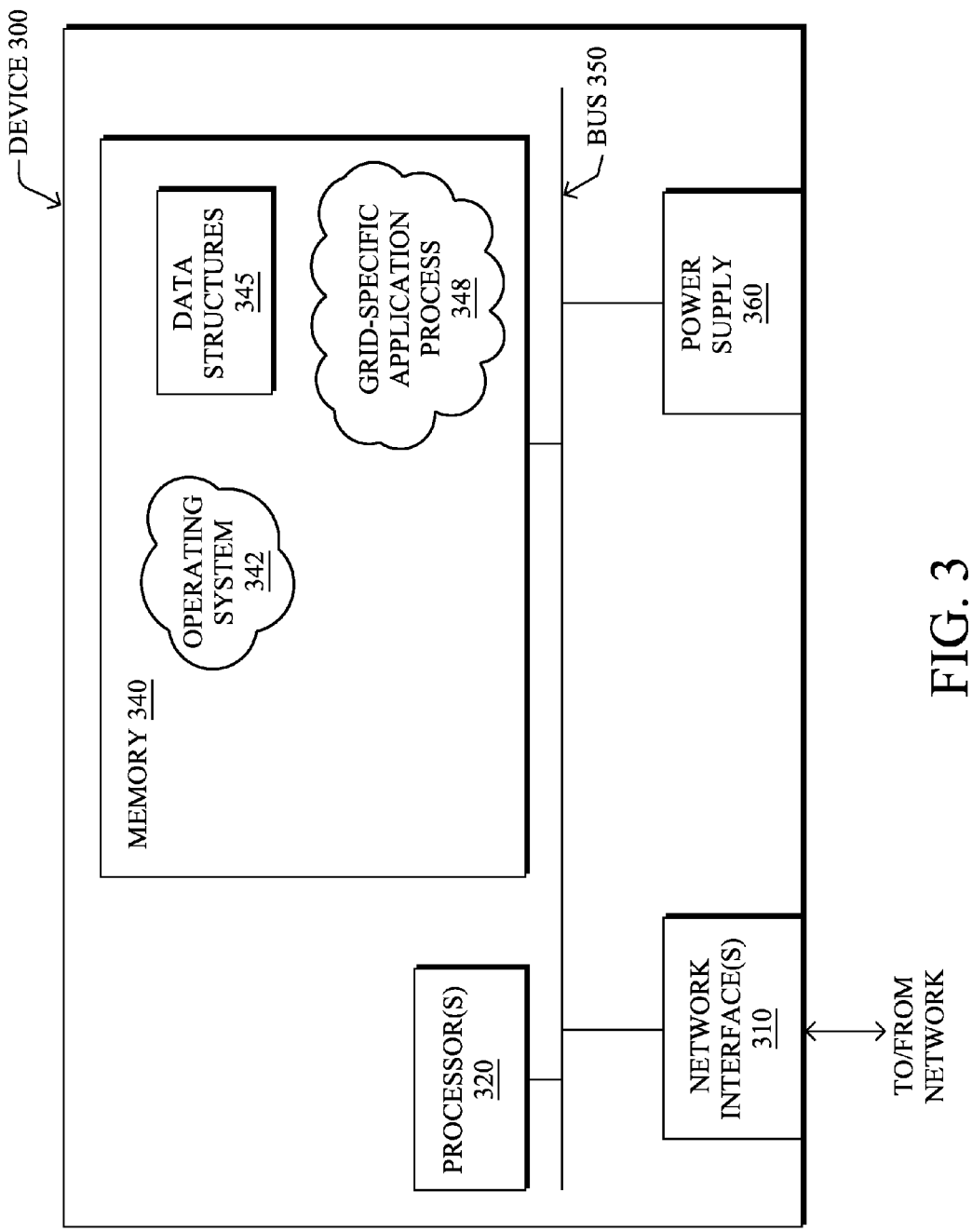
FIG. 3 illustrates an example simplified device/node.

FIG. 3 is a schematic block diagram of an example node/device 300 that may be used with one or more embodiments described herein, e.g., as any capable "smart grid" node shown in FIG. 2 above. In particular, the device 300 is a generic and simplified device, and may comprise one or more network interfaces 310 (e.g., wired, wireless, PLC, etc.), at least one processor 320, and a memory 340 interconnected by a system bus 350, as well as a power supply 360 (e.g., battery, plug-in, etc.).

The network interface(s) 310 contain the mechanical, electrical, and signaling circuitry for communicating data over links coupled to the network 200. The network interfaces may be configured to transmit and/or receive data using a variety of different communication protocols. Note, further, that the nodes may have two different types of network connections 310, e.g., wireless and wired/physical connections, and that the view herein is merely for illustration. Also, while the network interface 310 is shown separately from power supply 360, for PLC the network interface 310 may communicate through the power supply 360, or may be an integral component of the power supply. In some specific configurations the PLC signal may be coupled to the power line feeding into the power supply.

The memory 340 of the generic device 300 comprises a plurality of storage locations that are addressable by the processor 320 and the network interfaces 310 for storing software programs and data structures associated with the embodiments described herein. Note that certain devices may have limited memory or no memory (e.g., no memory for storage other than for programs/processes operating on the device and associated caches). The processor 320 may comprise necessary elements or logic adapted to execute the software programs and manipulate the data structures 345. An operating system 342, portions of which are typically resident in memory 340 and executed by the processor, functionally organizes the device by, inter alia, invoking operations in support of software processes and/or services executing on the device. These software processes and/or services may comprise one or more grid-specific application processes 348, as described herein. Note that while the grid-specific application process 348 is shown in centralized memory 340, alternative embodiments provide for the process to be specifically operated within the network elements or network-integrated computing elements 310.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, utility control systems and data processing systems have largely been centralized in nature. Energy Management Systems (EMS's), Distribution Management Systems (DMS's), and Supervisory Control and Data Acquisition (SCADA) systems reside in control or operations centers and rely upon what have generally been low complexity communications to field devices and systems. Both utilities and makers of various grid control systems have recognized the value of distributed intelligence, especially at the distribution level.

Generally, distributed intelligence is defined as the embedding of digital processing and communications ability in a physically dispersed, multi-element environment (specifically the power grid infrastructure, but also physical networks in general). In the area of sensing, measurement and data acquisition, key issues are:

Sensing and measurement—determination of quantities to be sensed, type and location of sensors, and resulting signal characteristics;

Data acquisition—collection of sensor data, sensor data transport;

System state and observability—key concepts that can be used to guide the design of sensor systems for physical systems with topological structure and system dynamics; and Sensor network architecture—elements, structure, and external properties of sensor networks.

Key elements of distributed intelligence comprise:

Distributed data collection and persistence—measurement of electrical grid state, power quality, asset stress and utilization factors, environmental data, real-time grid topology, and device operating states, as opposed to central SCADA;

Distributed data transformation and analytics—processing of measured data and event messages generated by smart grid devices and systems to extract useful information, prepare data for use by applications, or to correlate and filter data and events for aggregation purposes, as opposed to data center processing; and Distributed control—execution of actual control algorithms, with control commands being sent directly to grid control actuators for relatively local controllers, as opposed to central control.

By establishing the network as a platform (NaaP) to support distributed applications, and understanding the key issues around sensing and measurement for dynamic physical network systems, key capabilities of smart communication networks may be defined (e.g., as described below) that support current and future grid applications. In particular, as ICT (Information Communication Technology) networks converge with physical power grids and as "smart" functions penetrate the grid, centralized architectures for measurement and control become increasingly inadequate. Distribution of intelligence beyond the control center to locations in the power grid provides the opportunity to improve performance and increase robustness of the data management and control systems by addressing the need for low latency data paths and supporting various features, such as data aggregation and control federation and disaggregation.

In particular, there are a number of compelling arguments for using distributed intelligence in smart power grids, and in large scale systems in general, such as:

Low Latency Response—A distributed intelligence architecture can provide the ability to process data and provide it to the end device without a round trip back to a control center;

Low Sample Time Skew—Multiple data collection agents can easily minimize first-to-last sample time skew for better system state snapshots;

Scalability—No single choke point for data acquisition or processing; analytics at the lower levels of a hierarchical distributed system can be processed and passed on to higher levels in the hierarchy. Such an arrangement can keep the data volumes at each level roughly constant by transforming large volumes of low level data into smaller volumes of data containing the relevant information. This also helps with managing the bursty asynchronous event message data that smart grids can generate (example: last gasp messages from meters during a feeder momentary outage or sag). The scalability issue is not simply one of communication bottlenecking however—it is also (and perhaps more importantly) an issue of data persistence management, and a matter of processing capacity. Systems that use a central SCADA for data collection become both memory-bound and CPU-bound in a full scale smart grid environment, as do other data collection engines; and Robustness—Local autonomous operation, continued operation in the presence of fragmentation of the network, graceful system performance and functional degradation in the face of failures, etc.

Standard approaches to distributed processing suffer from shortcomings relative to the electric grid environment. These shortcomings include inability to handle incremental rollout, variable distribution of intelligence, and applications not designed for a distributed (or scalable) environment. Further, existing approaches do not reflect the structure inherent in power grids and do not provide integration across the entire set of places in the grid where intelligence is located, or across heterogeneous computing platforms. Current systems also suffer from inability to work with legacy software, thus requiring massive software development efforts at the application level to make applications fit the platform, and also lack zero-touch deployment capability and requisite security measures.

For instance, one major obstacle in the adoption of distributed intelligence, now that IP communications and embedded processing capabilities are becoming available in forms that utilities can use, is that utilities cannot make large equipment and system changes in large discrete steps. Rather they must go through transitions that can take years to complete. This is due to the nature of their mission and the financial realities utilities must deal with. In practice, utilities must be able to transition from centralized to distributed intelligence, and must be able to operate in a complicated hybrid mode for long periods of time, perhaps permanently. This means that the utility must be able to roll out distributed intelligence incrementally while maintain full operations over the entire service area, and must be able to modify the distributed architecture appropriately over time and geography. Simply having a distributed architecture implementation is not sufficient; it must be easily and continually mutable in terms of what functionality is distributed to which processing locations in the grid and must be capable of coexisting with legacy control systems where they remain in place. Therefore, there exist various kinds of variable topology for effective distributed intelligence:

Transition Variability—Rollout of distributed intelligence functions will be uneven both geographically (topologically) and over time, and there is no one-size-fits-all solution, even for a single utility;

End State Variability—Not every distributed intelligence function will be pushed to every end node of the same class, and distributed intelligence functions and distributions will have to change over the life of the system;

Operational Variability—Users must be able to change locations of functions to deal with failures and maintenance, etc.

Additionally, design and implementation of smart grids at scale poses a number of challenging architecture issues. Many of these issues are not apparent or do not show significant effects at pilot scale, but can become crucial at full scale. Note that generally herein, "at full scale" means one or more of:

Endpoint scale—the number of intelligent endpoints is in the millions per distribution grid;

Functional complexity scale—the number and type of functions or applications that exhibit hidden layer coupling through the grid is three or more; or the number of control systems (excluding protection relays) acting on the same feeder section or transmission line is three or more; and Geospatial complexity—the geographical/geospatial complexity of the smart grid infrastructure passes beyond a handful of substation service areas or a simple metro area deployment to large area deployments, perhaps with interpenetrated service areas for different utilities, or infrastructure that cuts across or is shared across multiple utilities and related organizations.

In the table 400 shown in FIG. 4, some of the challenges arising from these levels of complexity for smart grids at scale are illustrated. For instance, ultra large scale (ULS) characteristics of smart grids at scale are usually associated with decentralized control, inherently conflicting diverse requirements, continuous evolution and deployment, heterogeneous, inconsistent, and changing elements, and various normal failure conditions. Also, hidden couplings via the grid exist, since systems and controls are inherently coupled through grid electrical physics and therefore interact in ways that may be unaccounted for in system designs. The grid may further be viewed at scale as a multi-objective, multi-control system, where multiple controls affecting the same grid portions, and where some of the controls actually lie outside of the utility and/or are operating on multiple time scales. Moreover, bulk or aggregate control commands, especially as regards secondary load control and stabilization, may not consider the specific localities within the grid, and are not broken down to the feeder or even section level, taking into account grid state at the level. Lastly, smart grid-generated data must be used on any of a number of latency scales, some of which are quite short, thus precluding purely centralized processing and control approaches. Note that there are additional issues affecting architecture for smart grids at scale than those that are shown in FIG. 4, but these are representative of some of the key challenges.

The smart grid has certain key attributes that lead to the concept of core function classes supported by the smart grid. These key attributes include:

A geographically distributed analog infrastructure;

A digital superstructure consisting of digital processing layered on top of the analog superstructure, along with ubiquitous IP-based digital connectivity; and Embedded processors and more general smart devices connected to the edges of the smart grid digital superstructure and the analog infrastructure; these include both measurement (sensor) and control (actuator) devices.

Given this environment, and given our present understanding of the nature of the desired behavior of the power grid, we may identify a number of key function classes; functional groups that arise inherently from the combination of desired smart grid behavior, grid structure, and the nature of the digital superstructure applied to the grid. An understanding of these core function groups is key to developing a view toward a layered network services architecture for smart grids. A model is presented herein in which smart grid applications of any type are built upon a logical platform of core function classes that arise from the grid itself.

Figure 5:
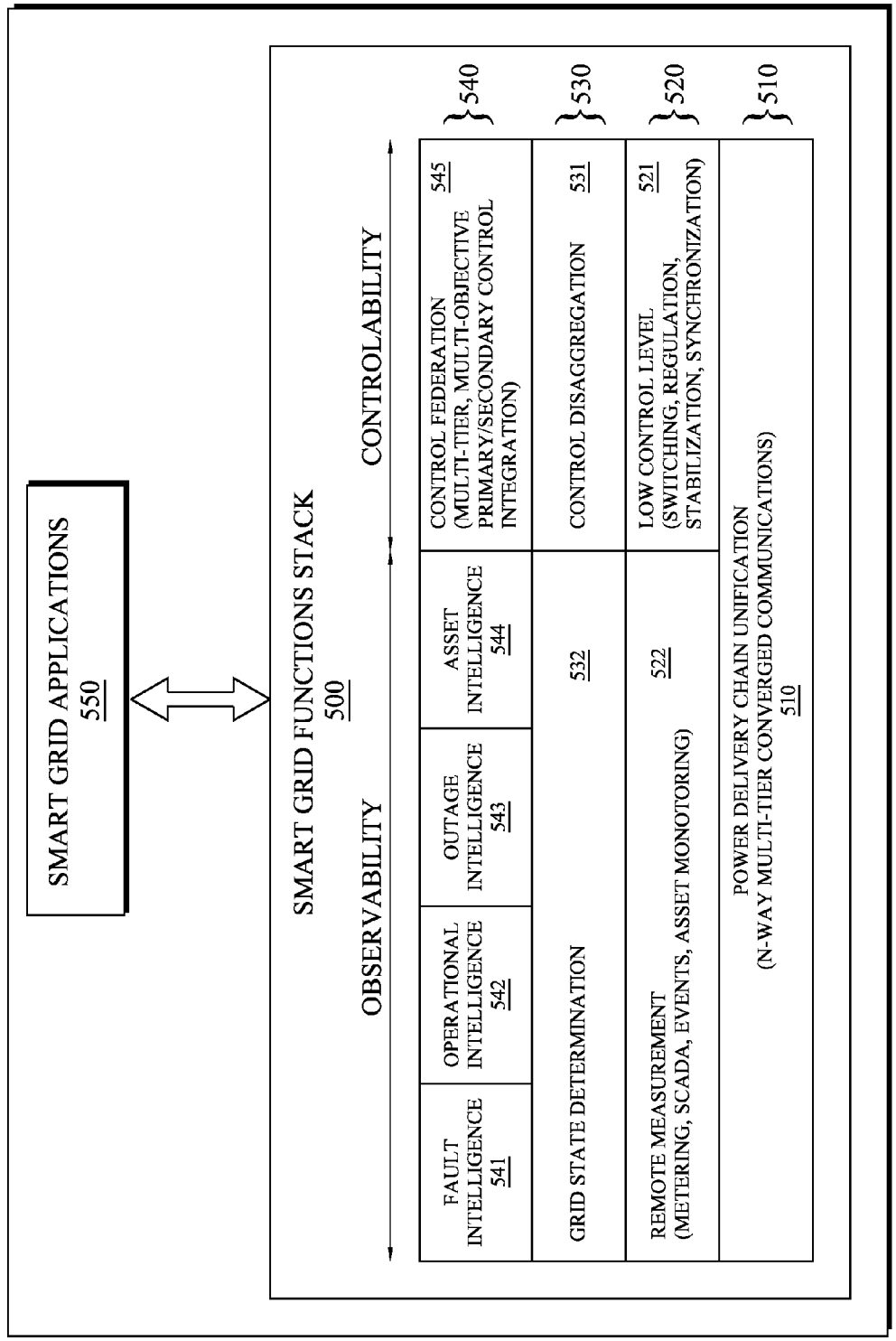
FIG. 5 illustrates an example of a smart grid core functions stack.

FIG. 5 illustrates the concept and the function classes themselves. For instance, to support distributed intelligence for electric power grids or any physical network, the concept of network services may be extended to become a stack of service groups, where the services become increasingly domain-oriented as one moves up the stack. This means that the lower layer contains ordinary network services. The next layer contains services that support distributed intelligence. The third layer provides services that support domain specific core functions. The top layer provides services that support application integration for real-time systems.

Specifically, as shown in the model of FIG. 5, the function classes are divided into four tiers.

1) The base tier 510 is:

Power Delivery Chain Unification: use of digital communications to manage is secure data flows and to integrate virtualized information services at low latency throughout the smart grid; enable N-way (not just two-way) flow of smart grid information; provision of integration through advanced networking protocols, converged networking, and service insertion. Note that this layer is based on advanced networking and communication, and in general may be thought of as system unification. In this model, networking plays a foundational role; this is a direct consequence of the distributed nature of smart grid assets.

2) The second tier 520 is:

Automatic Low Level Control 521—digital protection inside and outside the substation, remote sectionalizing and automatic reclosure, feeder level flow control, local automatic voltage/VAr regulation, stabilization, and synchronization; and Remote Measurement 522—monitoring and measurement of grid parameters and physical variables, including direct power variables, derived element such as power quality measures, usage (metering), asset condition, as-operated topology, and all data necessary to support higher level function classes and applications.

3) The third tier 530 is:

Control Disaggregation 531—control commands that are calculated at high levels must be broken down into multiple commands that align with the conditions and requirements at each level in the power delivery chain; the process to accomplish this is the logical inverse of data aggregation moving up the power delivery chain, and must use knowledge of grid topology and grid conditions to accomplish the disaggregation; and Grid State Determination 532—electrical measurement, power state estimation, and visualization, voltage and current phasors, bus and generator phase angles, stability margin, real and reactive power flows, grid device positions/conditions, DR/DSM available capacity and actual response measurement, storage device charge levels, circuit connectivity and device parametrics.

4) The fourth tier 540 is:

Fault Intelligence 541—detection of short or open circuits and device failures; fault and failure classification, characterization (fault parameters), fault location determination, support for outage intelligence, support for adaptive protection and fault isolation, fault prediction, fault information notification and logging;

Operational Intelligence 542—all aspects of information related to grid operations, including system performance and operational effectiveness, as well as states of processes such as outage management or fault isolation;

Outage Intelligence 543—detection of service point loss of voltage, inside/outside trouble determination, filtering and logging of momentaries, extent mapping and outage verification, root cause determination, restoration tracking and verification, nested root cause discovery, outage state and process visualization, crew dispatch support;

Asset Intelligence 544—this has two parts:
- asset utilization intelligence—asset loading vs. rating, peak load measurement (amplitude, frequency), actual demand curve measurement, load/power flow balance measurement, dynamic (real-time) de-rating/re-rating, real-time asset profitability/loss calculation; and
- asset health/accumulated stress intelligence—device health condition determination, online device and system failure diagnostics, device failure or imminent failure notification, asset accumulated stress measurement, Loss of Life (LoL) calculation, Estimated Time to Failure (ETTF) prediction, Asset Failure System Risk (AFSR) calculation; and Control Federation 545—grid control increasingly involves multiple control objectives, possible implemented via separate control systems. It is evolving into a multi-controller, multi-objective system where many of the control systems want to operate the same actuators. A core function of the smart grid is to federate these control systems that include Demand Response and DSM, voltage regulation, capacitor control, power flow control, Conservation Voltage Reduction (CVR), Electric Vehicle Charging Control, Line Loss Control, Load Balance Control, DSTATCOM and DER inverter VAr control, reliability event control, Virtual Power Plant (VPP) control, and meter connect/disconnect and usage restriction control.

These function classes may support one or more smart grid applications 550. In general, therefore, smart grid networks, that is, the combination of a utility grid with a communication network, along with distributed intelligent devices, may thus consist of various type of control, data acquisition (e.g., sensing and measurement), and distributed analytics, and may be interconnected through a system of distributed data persistence. Examples may include, among others, distributed SCADA data collection and aggregation, grid state determination and promulgation, implementation of distributed analytics on grid data, control command delivery and operational verification, control function federation (merging of multiple objective/multiple control systems so that common control elements are used in non-conflicting ways), processing of events streams from grid devices to filter, prevent flooding, and to detect and classify events for low latency responses, and providing virtualization of legacy grid devices so that they are compatible with modern approaches to device operation and network security.

In particular, there may be a number of types of control, such as sequence control (e.g., both stateless and stateful, typified by switching systems of various kinds), stabilizers (e.g., which moderate dynamic system behavior, typically through output or state feedback so that the system tends to return to equilibrium after a disturbance), and regulators (e.g., in which a system is made to follow the dynamics of a reference input, which may be dynamic or static set points). Quite often, all three of these are present in the same control system. In terms of electric power grids, flow control is sequence control, whereas model power oscillation damping and volt/VAr control represent stabilization and regulatory control, respectively.

Figure 6:
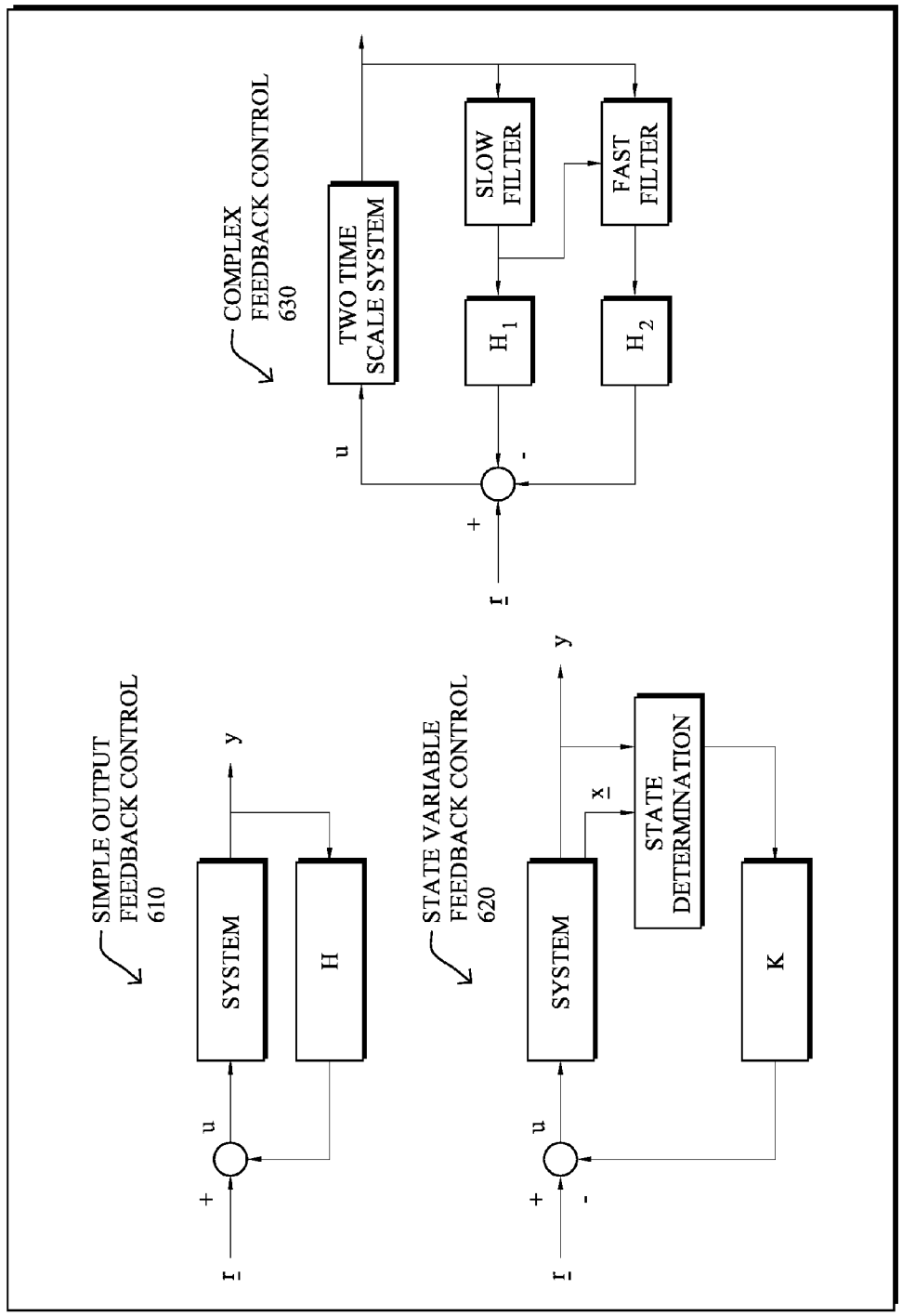
FIG. 6 illustrates an example of various feedback arrangements.

For most control systems, feedback is a crucial component. FIG. 6 illustrates output feedback 610 and state feedback 620, both of which are quite common. FIG. 6 also illustrates a slightly more complex feedback arrangement 630 intended to be used when a system exhibits two very different sets of dynamics, one fast and one slow. There are a great many extensions of the basic control loop and the volume of mathematics, theory, and practice is enormous and widely used.

Regarding data acquisition, sensing and measurement support multiple purposes in the smart grid environment, which applies equally as well to many other systems characterized by either geographic dispersal, or large numbers of ends points, especially when some form of control is required. Consequently, the sensing system design can be quite complex, involving issues physical parameter selection, sensor mix and placement optimization, measurement type and sample rate, data conversion, sensor calibration, and compensation for non-ideal sensor characteristics.

Additionally, collection of the data in large scale systems such as smart grids presents issues of cycle time, data bursting, and sample skew. There are multiple modes of data collection for large scale systems and each presents complexities, especially when the system model involves transporting the data to a central location. In the typical round-robin scanning approach taken by many standard SCADA systems, the time skew between first and last samples represents an issue for control systems that is insignificant when the scan cycle time is short compared to system dynamics, but as dynamics increase in bandwidth with advanced regulation and stabilization, and as the number of sensing points increases, the sample time skew problem becomes significant.

Data is consumed in a variety of ways and places in a power grid; most of these are not located at the enterprise data center and much grid data does not enter the data center. Some of it does not even enter the control/operations center, as it must be consumed "on the fly" in grid devices and systems. Consequently it is important to classify data according to the latency requirements of the devices, systems, or applications that use it and appropriate persistence (or lack thereof) must also be defined. Note that much grid data has multiple uses; in fact, it is an element of synergy that has significant impact on smart grid economics and system design (networking, data architecture, analytics) to ensure that data is used to support as many outcomes as possible.

Figure 7:
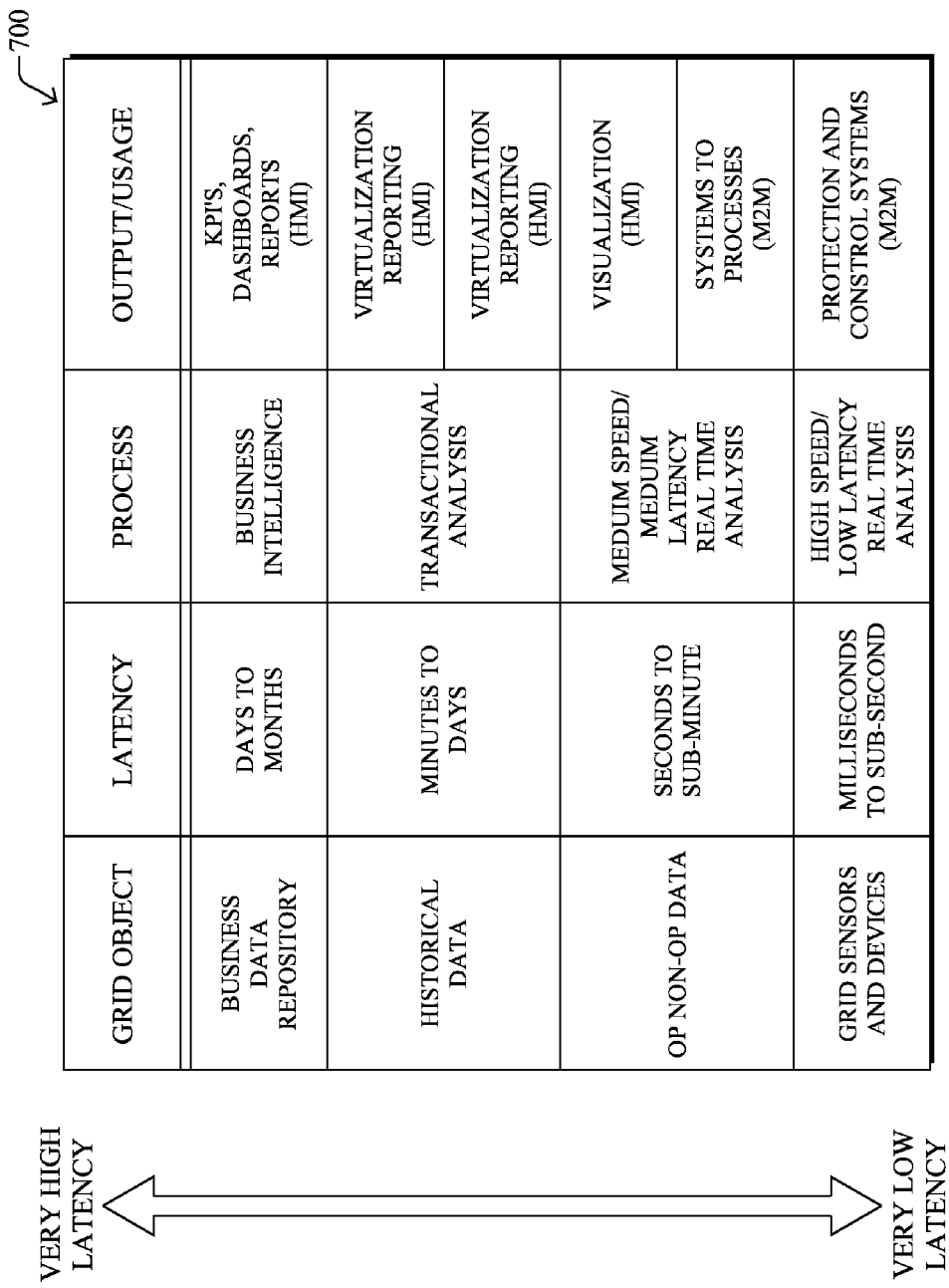
FIG. 7 illustrates an example chart showing a latency hierarchy.

FIG. 7 is a chart 700 that illustrates the issue of latency, as latency hierarchy is a key concept in the design of both data management and analytics applications for physical networks with control systems or other real-time applications. In particular, in the example (and non-limiting) chart 700, grid sensors and devices are associated with a very low latency, where high-speed/low-latency real-time analytics may require millisecond to sub-second latency to provide results through a machine-to-machine (M2M) interface for various protection and control systems. The latency hierarchy continues toward higher latency associations as shown and described in chart 700, until reaching a very high latency at the business data repository level, where data within days to months may be used for business intelligence processing, and transmitted via a human-machine interface (HMI) for various reporting, dashboards, key performance indicators (KPI's), etc. Note that the chart does not illustrate that a given data element may in fact have multiple latency requirements, depending on the various ways it may be used, meaning that any particular datum may have multiple destinations.

The latency hierarchy issue is directly connected to the issue of lifespan classes, meaning that depending on how the data is to be used, there are various classes of storage that may have to be applied. This typically results in hierarchical data storage architecture, with different types of storage being applied at different points in the grid that correspond to the data sources and sinks, coupled with latency requirements.

FIG. 8 illustrates a table 800 listing some types of data lifespan classes that are relevant to smart grid devices and systems. In particular, transit data exists for only the time necessary to travel from source to sink and be used; it persists only momentarily in the network and the data sink and is then discarded. Examples are an event message used by protection relays, and sensor data used in closed loop controls; persistence time may be microseconds. On the other hand, burst/flow data, which is data that is produced or processed in bursts, may exist temporarily in FIFO (first in first out) queues or circular buffers until it is consumed or overwritten. Examples of burst/flow data include telemetry data and asynchronous event messages (assuming they are not logged), and often the storage for these types of data are incorporated directly into applications, e.g., CEP engine event buffers. Operational data comprises data that may be used from moment to moment but is continually updated with refreshed values so that old values are overwritten since only present (fresh) values are needed. Examples of operational data comprise grid (power) state data such as SCADA data that may be updated every few seconds. Transactional data exists for an extended but not indefinite time, and is typically used in transaction processing and business intelligence applications. Storage of transactional data may be in databases incorporated into applications or in data warehouses, datamarts or business data repositories. Lastly, archival data is data that must be saved for very long (even indefinite) time periods, and typically includes meter usage data (e.g., seven years), PMU data at ISO/RTO's (several years), log files, etc. Note that some data may be retained in multiple copies; for example, ISO's must retain PMU data in quadruplicate. Just as with latency hierarchy, grid data may progress through various lifetime classes as it is used in different ways. This implies that some data will migrate from one type of data storage to another as its lifetime class changes, based on how it is used.

Distributed analytics may be implemented in a fully centralized manner, such as usually done with Business Intelligence tools, which operate on a very large business data repository. However, for real-time systems, a more distributed approach may be useful in avoiding the inevitable bottlenecking. A tool that is particularly suited to processing two classes of smart grid data (streaming telemetry and asynchronous event messages) is Complex Event Processing (CEP) which has lately also been called streaming database processing. CEP and its single stream predecessor Event Stream Processing (ESP) can be arranged into a hierarchical distributed processing architecture that efficiently reduces data volumes while preserving essential information embodies in multiple data streams.

Figure 9:
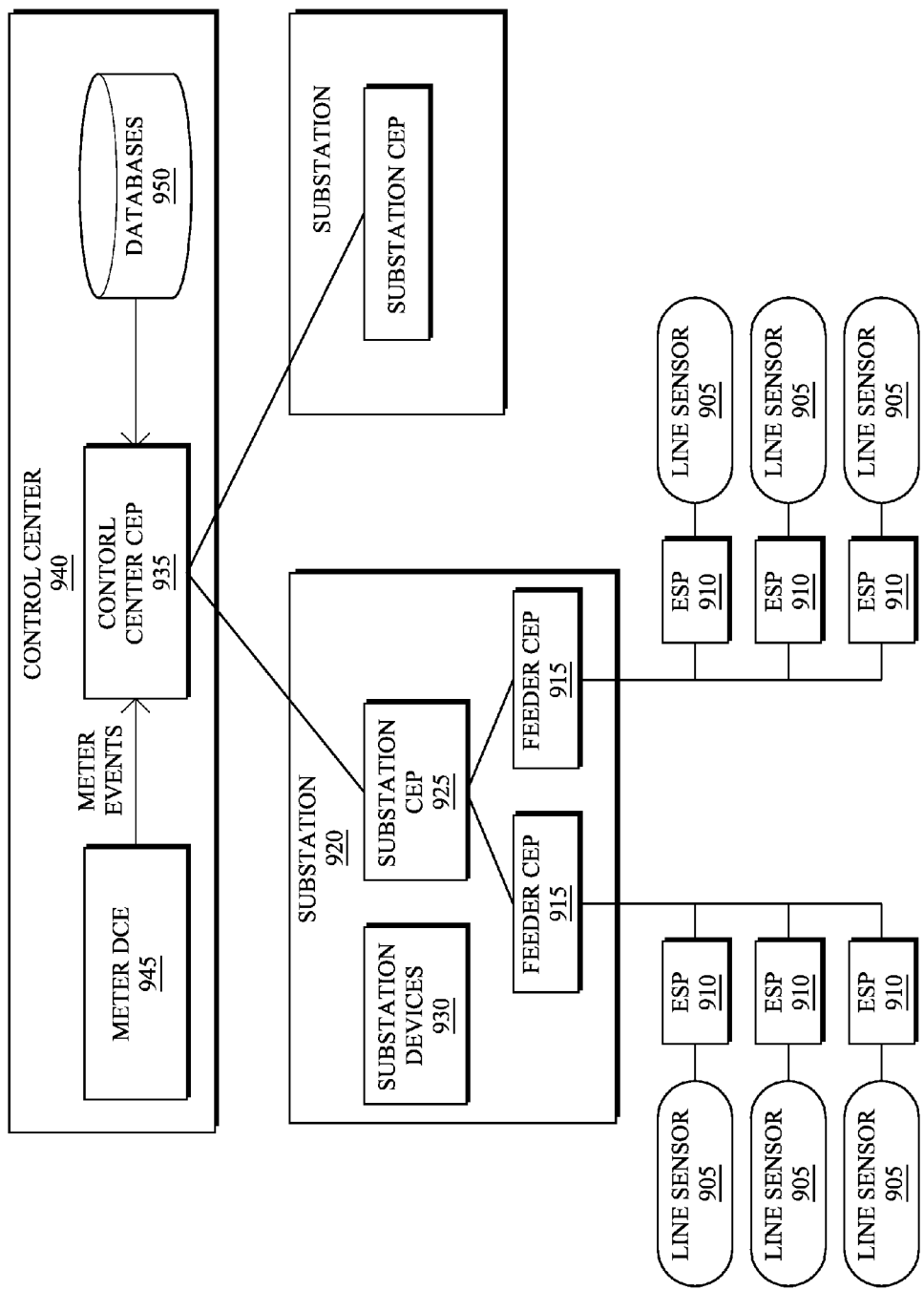
FIG. 9 illustrates an example of an analytics architecture.

FIG. 9 shows an example of such analytics architecture. In this case, the analytics process line sensor data and meter events for fault and outage intelligence. In particular, various line sensors 905 may transmit their data via ESPs 910, and may be collected by a feeder CEP 915 at a substation 920. Substation CEPs 925 aggregate the feeder CEP data, as well as any data from substation devices 930, and this data may be relayed to a control center CEP 935 within a control center 940. Along with meter events from meter DCE 945 and other data from database 950, the control center CEP 935 may thus perform a higher level of analytics than any of the below levels of CEPs, accordingly.

In general, distributed analytics can be decomposed into a limited set of analytic computing elements ("DA" elements), with logical connections to other such elements. Full distributed analytics can be constructed by composing or interconnecting basic analytic elements as needed. Five basic types of distributed analytic elements are defined herein, and illustrated in FIG. 10:

1. Local loop 1010—an analytic element operates on data reports its final result to a consuming application such as a low latency control;
2. Upload 1020—an analytic element operates on data and then reports out its final result;

3. Hierarchical 1030—two or more analytic elements operate on data to produce partial analytics results which are then fused by a higher level analytics element, which reports the result;
4. Peer to peer 1040—two or more analytics elements operate on data to create partial results; they then exchange partial results to compute final result and each one reports its unique final analytic; and
5. Database access 1050—an analytic element retrieves data from a data store in addition to local data; it operates on both to produce a result which can be stored in the data store or reported to an application or another analytic element A sixth type, "generic DA node" 1060, may thus be constructed to represent each of the five basic types above.

Figure 10:
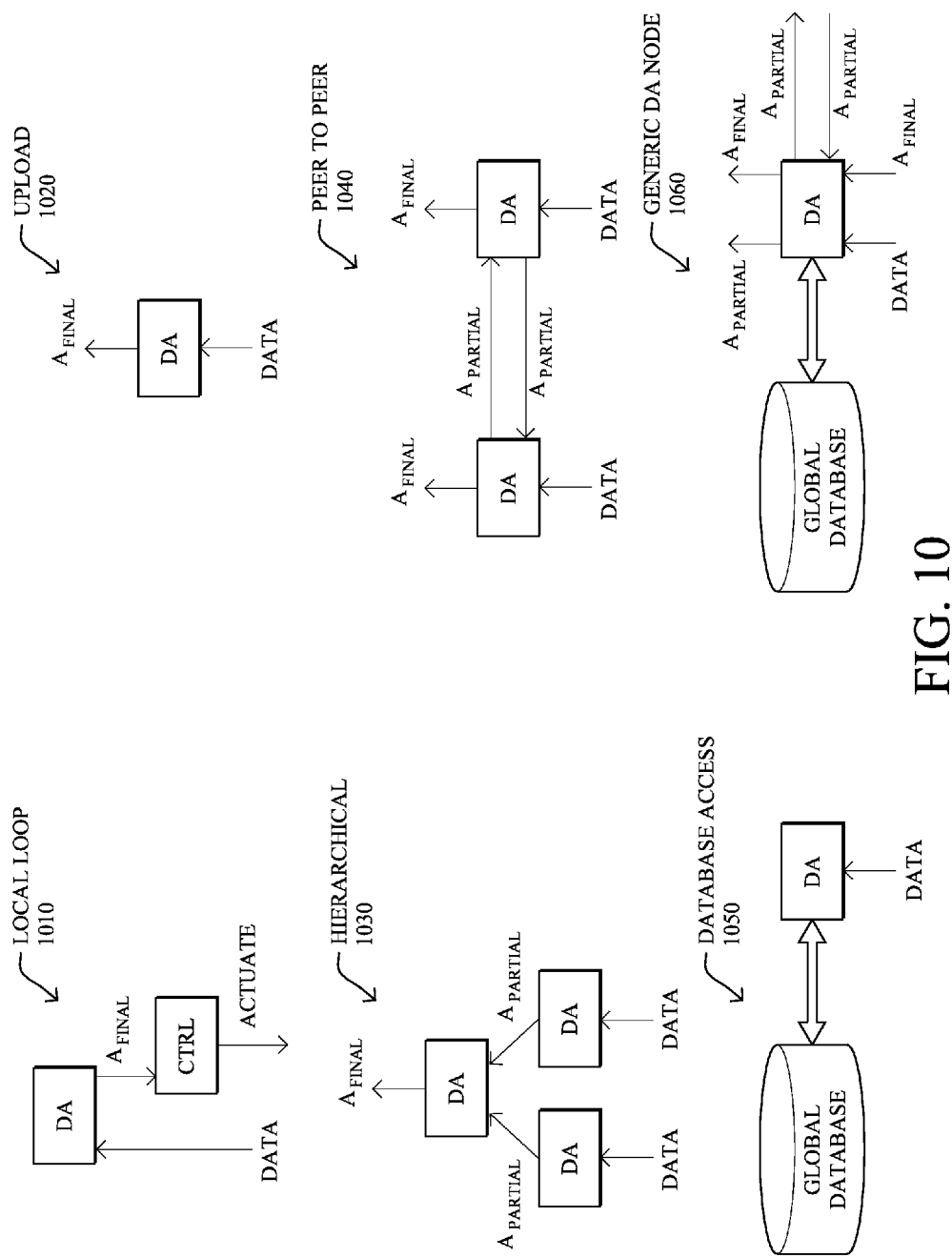
FIG. 10 illustrates an example of types of distributed analytic elements.

Given the above-described concept of distributed analytics, including the database access element 1050 shown in FIG. 10, it becomes useful to consider distributed data persistence as an architectural element. Low level and low latency analytics for smart grids (mostly related to control) require state information and while local state components are generally always needed, it is often the case that elements of global state are also necessary. Operational data (essentially extended system state) may be persisted in a distributed operational data store. The reason for considering a true distributed data store is for scalability and robustness in the face of potential network fragmentation. In power systems, it is already common practice to implement distributed time series (historian) databases at the control center and primary substation levels. The techniques described herein may incorporate this and the distributed operational data store into an integrated data architecture by employing data federation in conjunction with various data stores.

Figure 11:
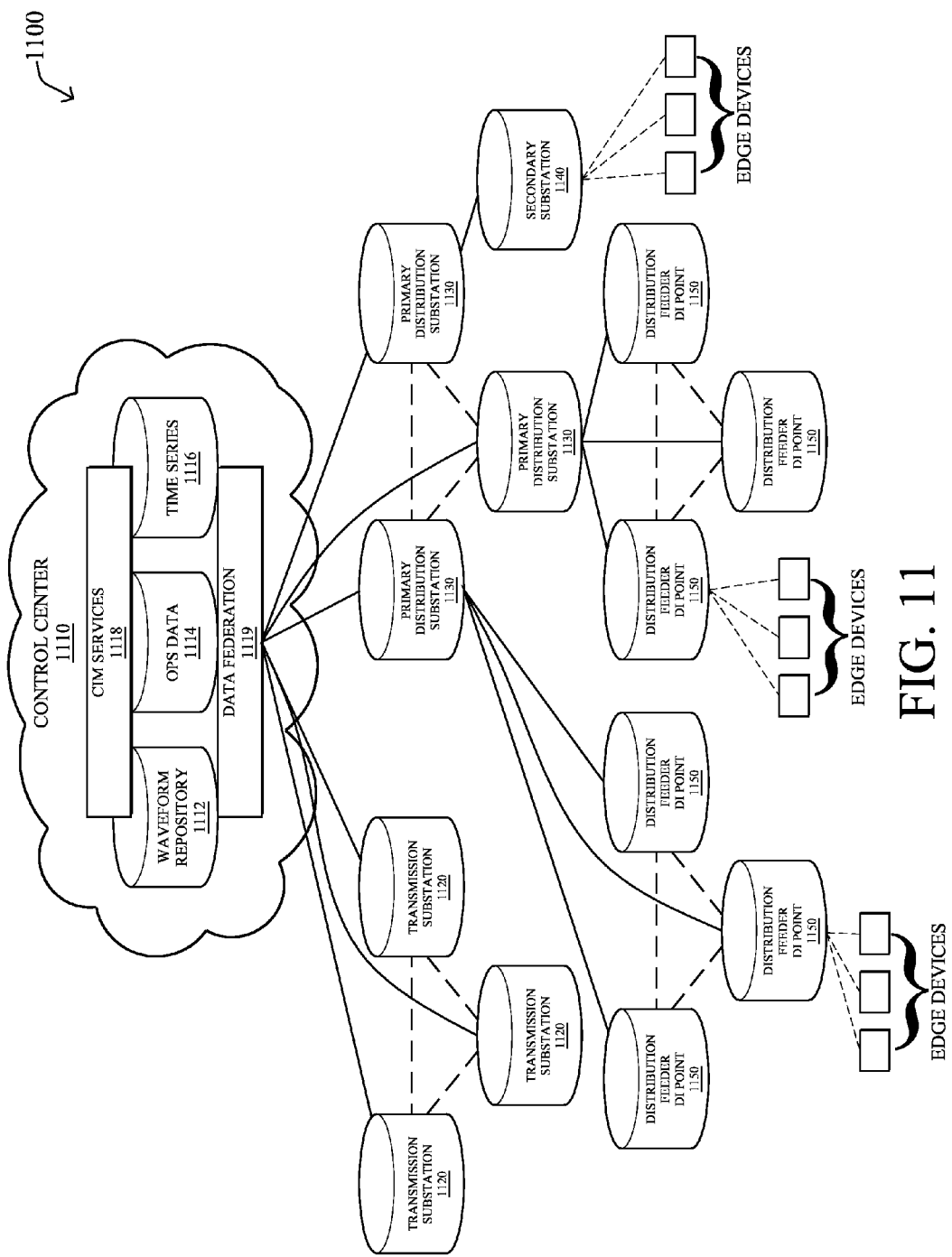
FIG. 11 illustrates an example data store architecture.

FIG. 11 illustrates a data store architecture 1100 that federates distributed and centralized elements in order to support a wide range of analytics, controls, and decision support for business processes. In particular, a control center 1110 may comprise various centralized repositories or databases, such as a waveform repository 1112, an operational (Ops) data database 1114, and a time series database 1116. For instance, common interface model (CIM) services 1118 within the control center 1110 may operate based on such underlying data, as may be appreciated in the art. The data itself may be federated (e.g., by data federation process 1119) from various transmission substation databases 1120, primary distribution substation databases 1130, secondary substation databases 1140, distribution feeder (or other distributed intelligence point) database 1150. Typically, edge devices (end-points, sites, etc.) need not have further database or storage capabilities, but may depending upon various factors and considerations of a given implementation.

Notably, the architecture herein may build upon the core function groups concept above to extend grid capabilities to the control center and enterprise data center levels, using the layer model to unify elements and approaches that have typically been designed and operated as if they were separate and unrelated. This model may also be extended to provide services related to application integration, as well as distributed processing. This yields a four tier model, wherein each tier is composed of multiple services layers. The four tiers are as follows (from the bottom of the stack upward), where each of the layers and tiers is intended to build upon those below them:
1. Network services;
2. Distributed Intelligence services;
3. Smart Grid Core Function services; and
4. Application Integration services.

Figure 12A:
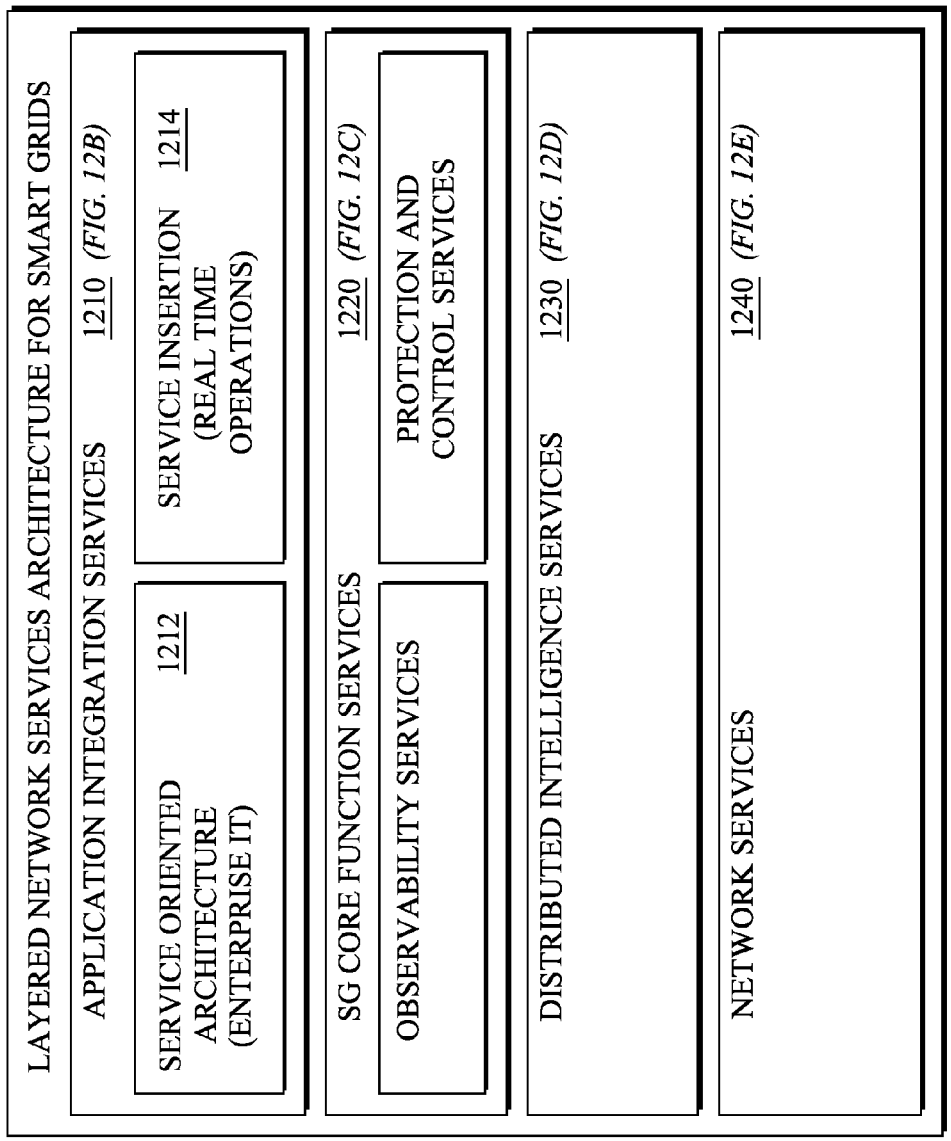
FIGS. 12A-12E illustrate an example layered services architecture model ("stack")
Figure 12B:
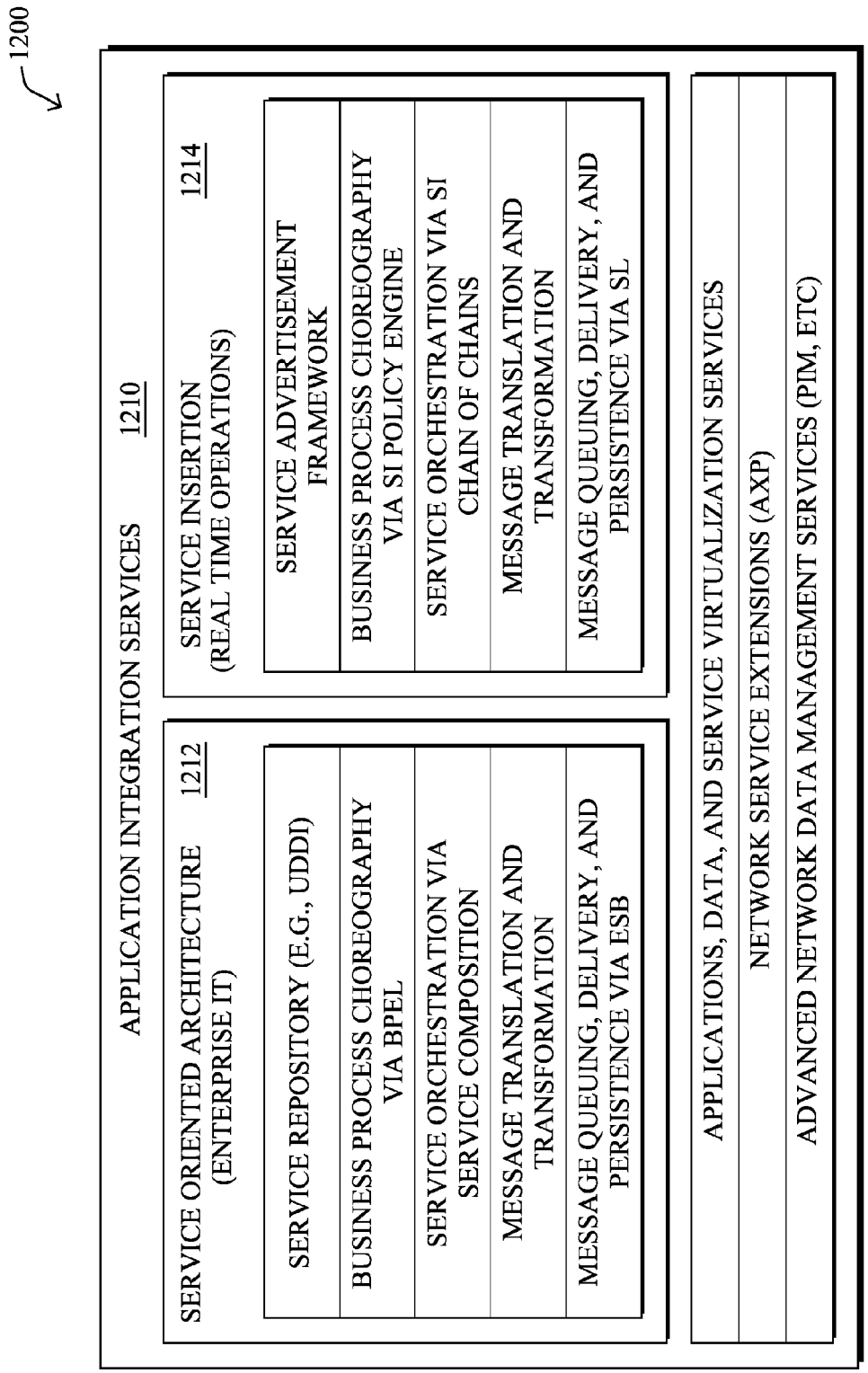
Figure 12C:
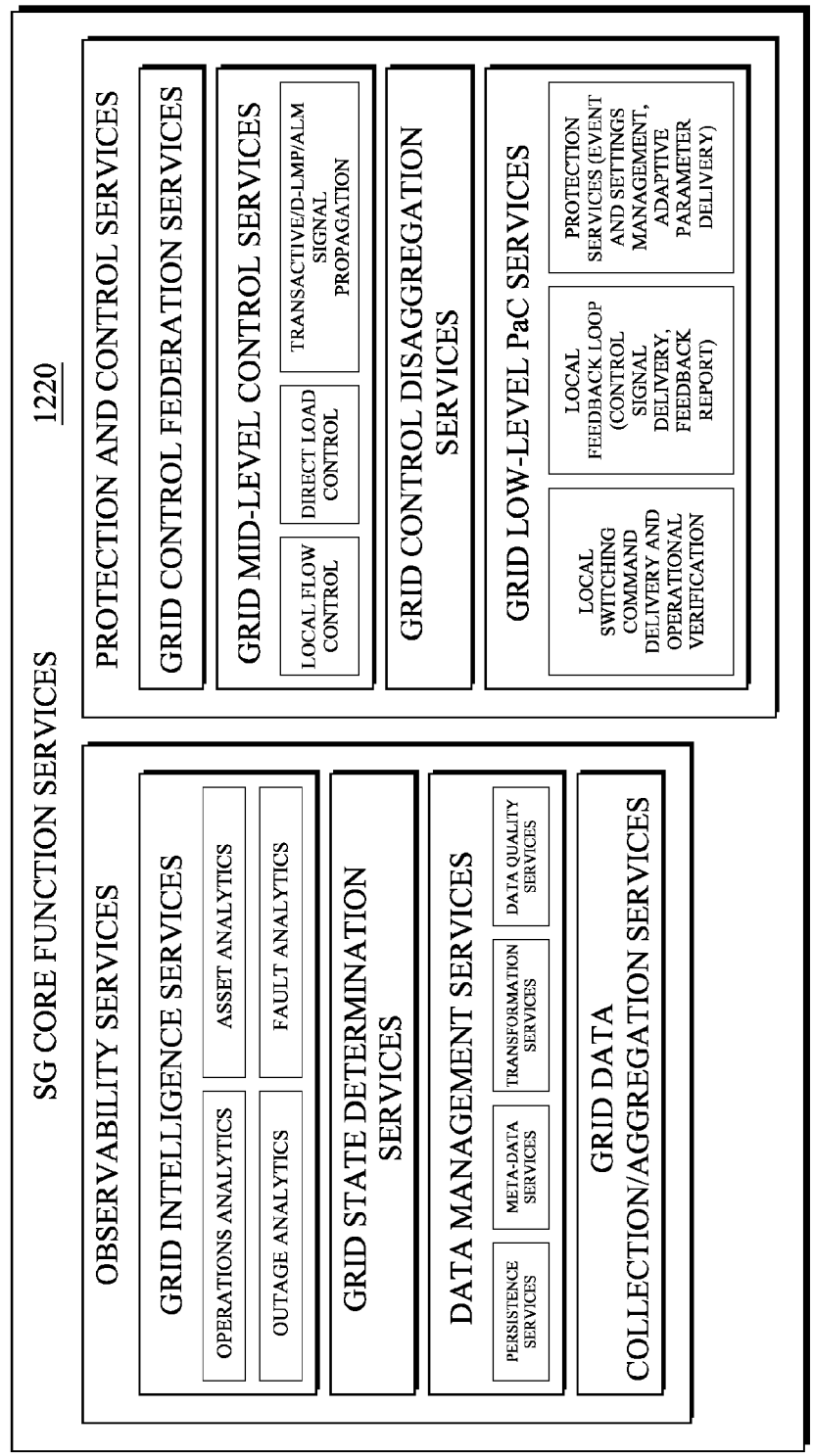
Figure 12D:
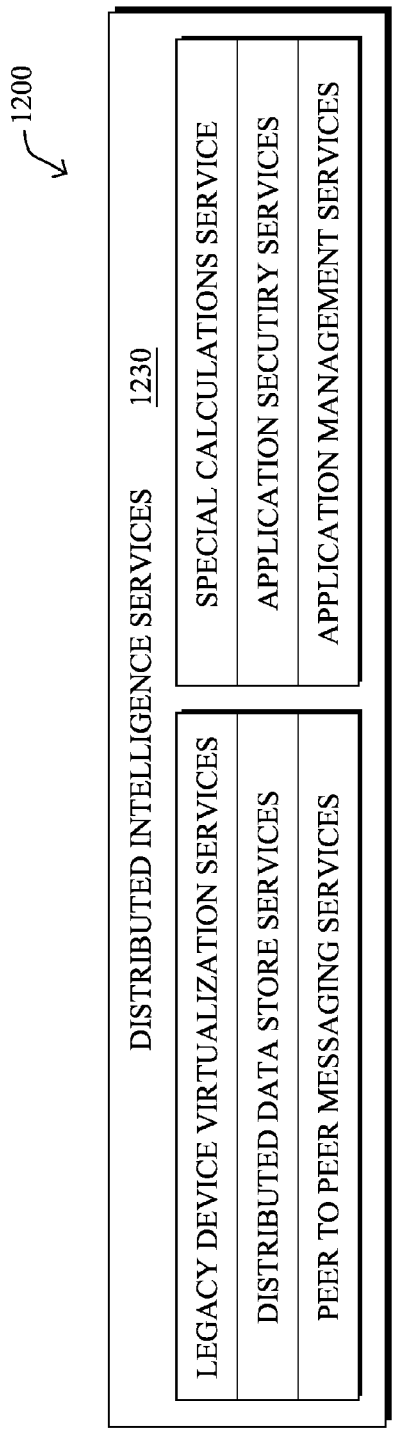
Figure 12E:
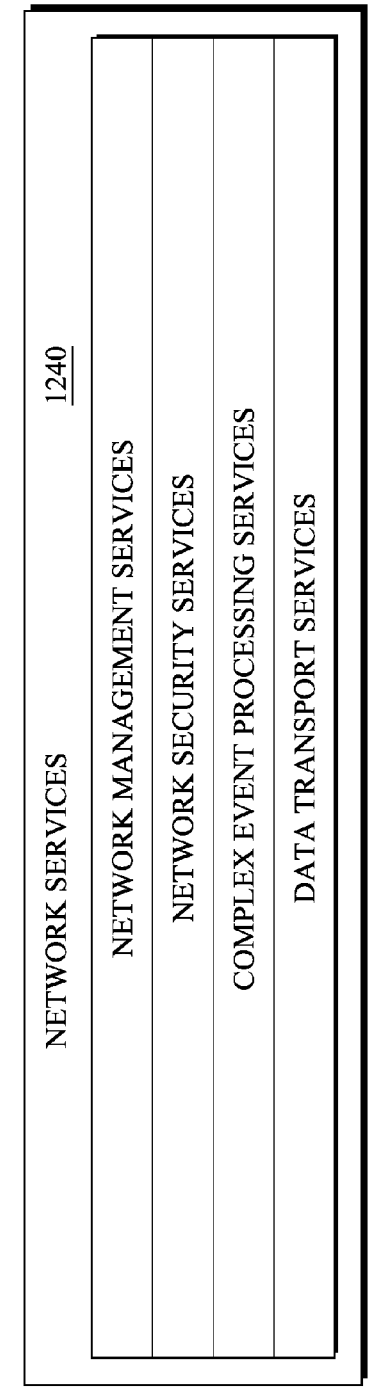

FIGS. 12A-12E illustrates the Layered Services Architecture model ("stack") 1200. In particular, FIG. 12A shows a full stack model for the layered services. Application Integration Services 1210 comprises services that facilitate the connection of applications to data sources and each other. Note that at this top layer the stack splits into two parallel parts as shown in FIG. 12B: one for enterprise level integration 1212 and one for integration at the real-time operations level 1214. For the enterprise level, there are many available solutions, and the use of enterprise service buses and related middleware in a Service Oriented Architecture (SOA) environment is common. For the real-time operations side, the architecture herein relies less on such middleware tools and much more on network services. This is for two reasons: network-based application integration can perform with much lower latencies than middleware methods, and the use of middleware in a control center environment introduces a layer of cost and support complexity that is not desirable, given that the nature of integration at the real-time operations level does not require the more general file transfer and service composition capabilities of the enterprise SOA environment. The enterprise side of the application integration layer is not actually part of the distributed intelligence (DI) platform; it is shown for completeness and to recognize that interface to this form of integration environment may be needed as part of a fully integrated computing platform framework.

Additionally, the Smart Grid Core Function Services layer 1220 (detailed in FIG. 12C) generally comprises the components listed above in FIG. 5, namely services that derive from or are required by the capabilities of the smart grid superstructure. Moreover, the Distributed Intelligence Services layer 1230 (FIG. 12D) comprises support for data processing and data management over multiple, geographically dispersed, networked processors, some of which are embedded. Lastly, Network Services layer 1240 (FIG. 12E) comprises IP-based data transport services for grid devices, processing systems, and applications. Note that CEP is illustratively included here because it is fundamental to network management in the core grid architecture model.

Figure 13:
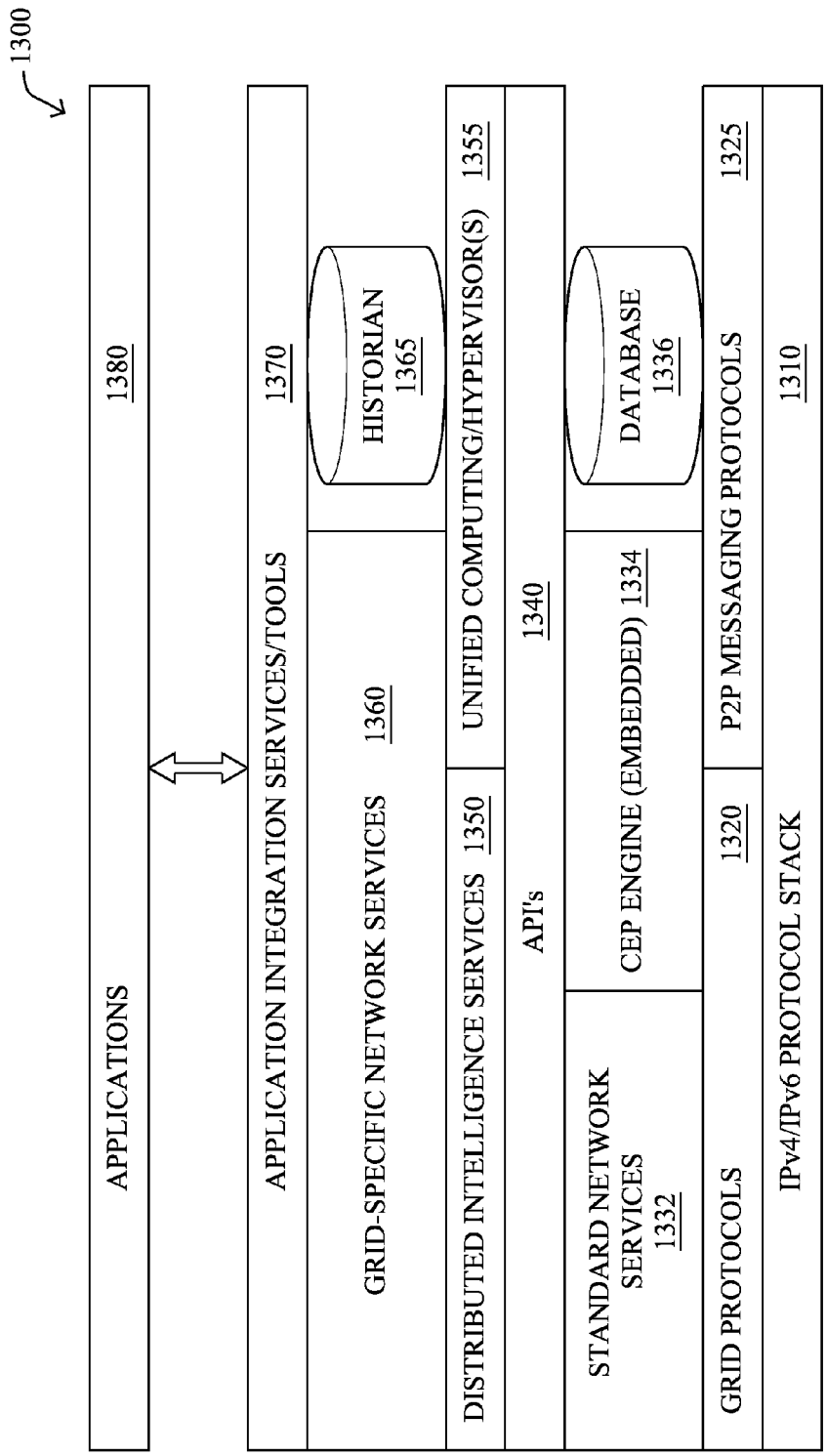
FIG. 13 illustrates an example logical stack for a distributed intelligence platform
Figure 14A:
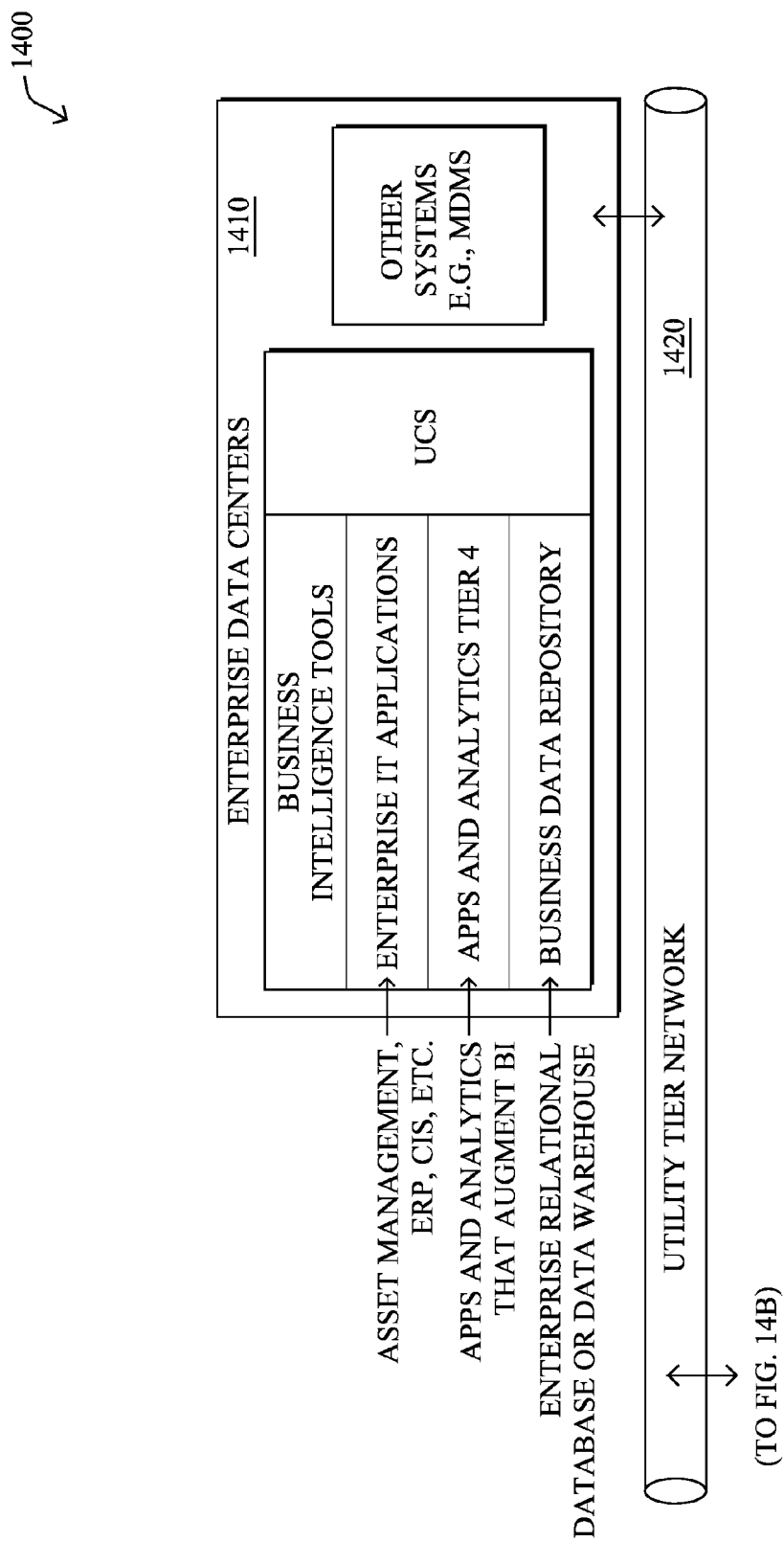
FIGS. 14A-14D illustrate an example of a layered services platform.
Figure 14B:
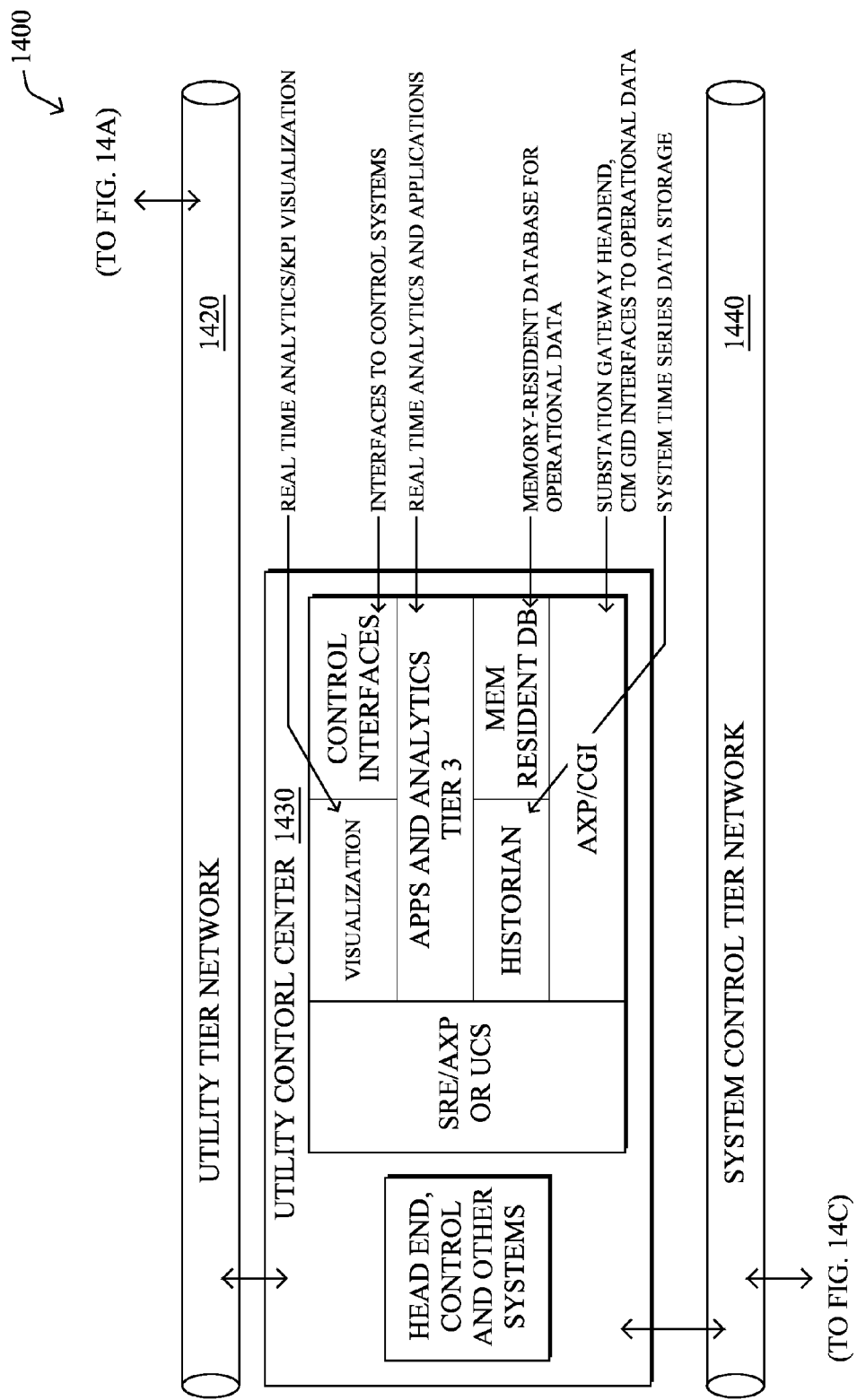
Figure 14C:
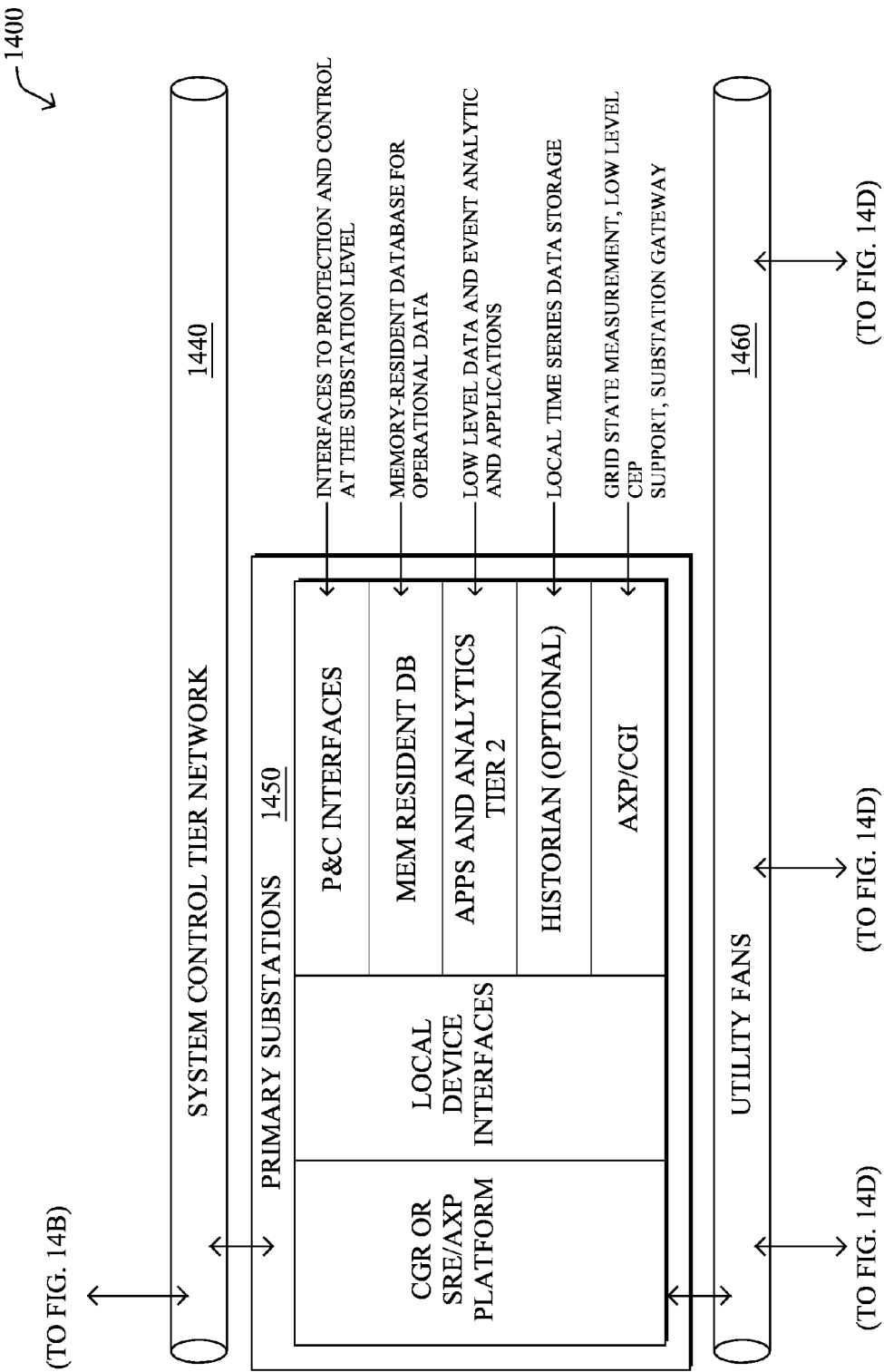
Figure 14D:
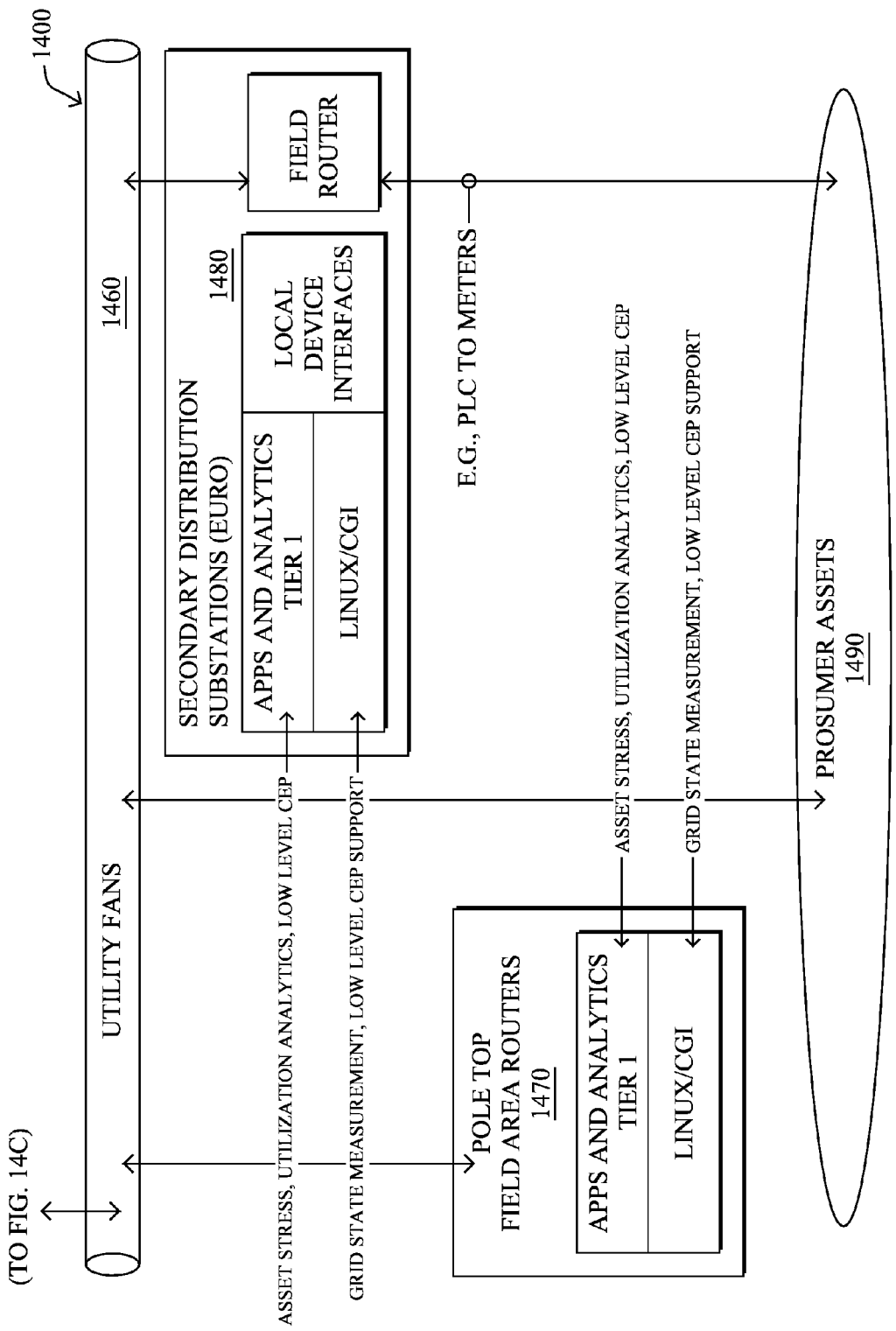

Another way of approaching the layered services stack as shown in FIGS. 12A-12E above is from the perspective of the devices themselves, particularly as a logical stack. For instance, a logical stack 1300 for the distributed intelligence platform is illustrated in FIG. 13. Note that not all parts of this stack 1300 are intended to be present in every processing node in a system. FIG. 13 is correlated with the layered services stack 1200 of FIGS. 12A-12E, but the logical stack 1300 also shows placement of two types of data stores (historian 1365 to store a time series of data, thus maintaining a collection of (e.g., all of) the past values and database 1336 to store generally only the most recent (e.g., periodically refreshed) values of a set of operational variables), as well as an API layer 1340 to expose certain capabilities of the platform to the applications and to upper levels of the platform stack. Generally, at the base of the stack 1300 is the known IPv4/v6 protocol stack 1310, above which are grid protocols 1320 and peer-to-peer (P2P) messaging protocols 1325. Further up the stack 1300 are standard network services 1332, embedded CEP engines 1334, and the distributed database 1336. Through the API layer 1340, the stack 1300 reaches distributed intelligence services 1350 and unified computing/hypervisor(s) 1355, upon which rest grid-specific network services 1360 and historians 1365. Application integration services/tools 1370 tops the stack 1300, allowing for one or more applications 1380 to communicate with the grid devices, accordingly.

Based on the description above, a layered services platform may be created, which is a distributed architecture upon which the layered services and smart grid applications may run. The distributed application architecture makes use of various locations in the grid, such as, e.g., field area network routers and secondary substation routers, primary substations, control centers and monitoring centers, and enterprise data centers. Note that this architecture can be extended to edge devices, including devices that are not part of the utility infrastructure, such as building and home energy management platforms, electric vehicles and chargers, etc.

FIGS. 14A-14D illustrate an example of the layered services platform described above. For instance, as detailed in FIGS. 14A-14D, enterprise data centers 1410 may comprise various business intelligence (BI) tools, applications (enterprise resource planning or "ERP," customer information systems or "CIS," etc.), and repositories based on a unified computing system (UCS). Other systems, such as meter data management systems (MDMS) may also be present. Via a utility tier network 1420, the enterprise data centers 1410 may be in communicative relationship with one or more utility control centers 1430, which comprise head-end control and other systems, in addition to various visualization tools, control interfaces, applications, databases, etc. Illustratively, a services-ready engine (SRE), application extension platform (AXP), or UCS may structurally organize the utility control centers 1420. Through a system control tier network 1440, one or more primary substations 1450 may be reached by the control centers 1430, where a grid connected router (GCR) interconnects various services (apps, databases, etc.) through local device interfaces. Utility FANs (field area networks) 1460 (or neighborhood area networks (NAN's)) may then bridge the gap to pole top FARs 1470, or else (e.g., in Europe) secondary distribution substations 1480 to reach various prosumer (professional consumer) assets 1490, accordingly.

Grid Control Federation

As noted above, grid control operations comprise multi-objective, multi-controller (MO/MC) systems that frequently encounter situations in which more than one system controller attempts to control the same device/system for conflicting purposes. When such a conflict arises in the utility grid network, the two potentially conflicting control commands need to be resolved in order to ensure proper grid control/operation.

The techniques herein provide grid control federation as a network service that may be applied to grid control operations to mitigate conflicting control commands in an optimal manner. In other words, grid control federation may be a network service that provides a set of policies/rules to resolve conflicts involving two or more local controllers attempting to use the same control device/system in a different/inconsistent manner, or attempting to control the same physical variable in a different/inconsistent manner. The techniques herein optimize grid control by providing conflict resolution services between two or more grid controller devices that are separate and/or siloed, and where one or both of the grid controller devices are closed. Additionally, grid control federation provides conflict resolution services between "smart" grid controller devices and "non-smart" grid controller devices (e.g., legacy devices).

Specifically, according to one or more embodiments of the disclosure as described in detail below, a federation device receives one or more grid control-based signals over a computer network, applies one or more utility grid control policies to the one or more grid control-based signals, and federates the one or more signals and/or the one or more utility grid control policies into one or more federated control-based signals. The federation device then propagates the one or more federated control-based signals to one or more grid-related devices.

Illustratively, the techniques described herein may be performed by hardware, software, and/or firmware, such as in accordance with the grid-specific application process 348, which may contain computer executable instructions executed by the processor 320 to perform functions relating to the techniques described herein. For example, the techniques herein may be treated as a "grid control federation process," (e.g., a control federation component 545 of stack 500 above), and may be located across a distributed set of participating devices 300, such as grid controller devices, sub-grid controller devices, and the like, as described herein, with functionality of the process 348 specifically tailored to the particular device's role within the techniques of the various embodiments detailed below.

Operationally, the techniques herein allow for grid control federation as an extended network service, illustratively through the grid control federation services of SG core function services layer 1220 in the stack 1200 of FIGS. 12A-12E above. In general, when more than one system controller (e.g., a grid controller device) attempts to control the same device/system within the utility grid, the control command conflict needs to be resolved in a manner that optimizes the resulting outcome with respect to global/local grid operations.

Consider, for example, the situation where a first grid controller device may wish to open a circuit, while a second grid controller device wishes to close the same circuit. As another example, consider the situation in which a first grid controller device issues a control command to increase reactive power for feeder voltage stabilization, while a second grid controller device issues a control command to lower reactive power for loss minimization. If these two control commands are performed by a single control program, the program may be written to resolve the conflict autonomously. However, when the control commands are issued by grid controller devices that are separate and/or siloed, and one or both of the grid controller devices are closed, then resolution of the control command conflict is very difficult.

In the context of the smart grid and other large scale control systems, additional strategies may be required to deal with problems that arise at scale. For example, as indicated above, one problem is that any such complex control system will be a MO/MC in which more than one control (e.g., a controller, grid controller device, etc.) may want to manipulate the same output device or physical system variable, but for differing goals. These types of issues may arise because new controls are added to systems having legacy controls that are not open, or because large control problems may be decomposed into smaller ones, which results in multiple controls that solve the larger problem when integrated. Additionally, it may not always be possible to build a new control system that integrates all of the new controls; consequently, even in a new system the need for control command federation may arise.

According to the techniques herein, grid control federation may implement networking technology to redirect data streams (inputs, feedbacks, and/or control signals) to a network service that performs the control command federation (e.g., coordination, combination, and/or conflict resolution) according to appropriate rules/policies set by the control engineer. As shown in FIGS. 15A-15B, there are various control designs (structures) that may present themselves within a utility grid, and that may thus benefit from combining multiple controls into coordinated controls and/or conflict resolution.

As a first example, grid control may be established as an indirect dependent design 1520, in which a first grid controller 1512 ("C1") and a second grid controller 1514 ("C2") may receive respective inputs 1502, and direct grid control commands 1504 to a grid device/system/process 1522 ("P") while receiving feedback 1506 from the output of grid device/system/process 1522.

A grid control process may also be set up as a cascaded controller process 1530 (subordinal dependency), which implements a first grid controller 1512 and a second grid controller 1514 in series. In other words, from a single input 1502, a resultant grid control command 1504 issued by the first grid controller 1512 may be directed to a grid device/system/process 1532 via the second grid controller 1514. Feedback 1506 in this instance returns to the first grid controller 1512.

As yet another example, a grid control design may be established as either a hard conditional dependency 1540 or a soft conditional dependency 1550. In the case of a hard conditional dependency 1540, a first grid controller 1512 and a second grid controller 1514 may be arranged relative to a grid device/system/process 1544 in the same indirect dependent 1520 configuration described above, with the exception that a switch device/process/system 1542 may be interspersed between the two grid controllers 1512 and 1514 and the grid device/system/process 1544 to select one of the two control commands 1504. In the case of a soft conditional dependency 1550, the configuration is the same as that for a hard conditional dependency 1540 except that switch device/process/system 1542 is replaced with a weighting algorithm for the control commands 1504, such as a first weight 1552 for the first control, a second weight 1554 for the second control, and a conflict resolution process 1556 (e.g., a "one or the other" selection, or else a weighted control combination).

As still another example, an independent grid control design 1560 may also benefit from the techniques herein, where controllers and devices are not immediately related (e.g., are not connected), but whose operation may be related in a manner that may still conflict (e.g., independently operated systems under the administrative control of a global policy). In particular, a first grid controller 1512 may receive input signals 1502 to direct commands 1504 toward a first grid device 1562, while a second grid controller 1514 may direct commands 1504 toward a second grid device 1564. Each device also supplies independent feedback 1504 to its respective controller.

In these configurations, federation techniques as described herein may function to coordinate complimentary control commands and/or resolve any conflicting control commands. In particular, according to the techniques herein, when one or more of the inputs 1502, control signals 1504, and feedbacks 1506 are directed over a computer network, as in many large scale control systems, networking technology (routing/forwarding) may be used to redirect such data streams to a network service (federating process) that performs the combination according to appropriate policies. Examples of such redirection and federation are shown and described with reference to FIGS. 16A-16C below.

Figure 16A:
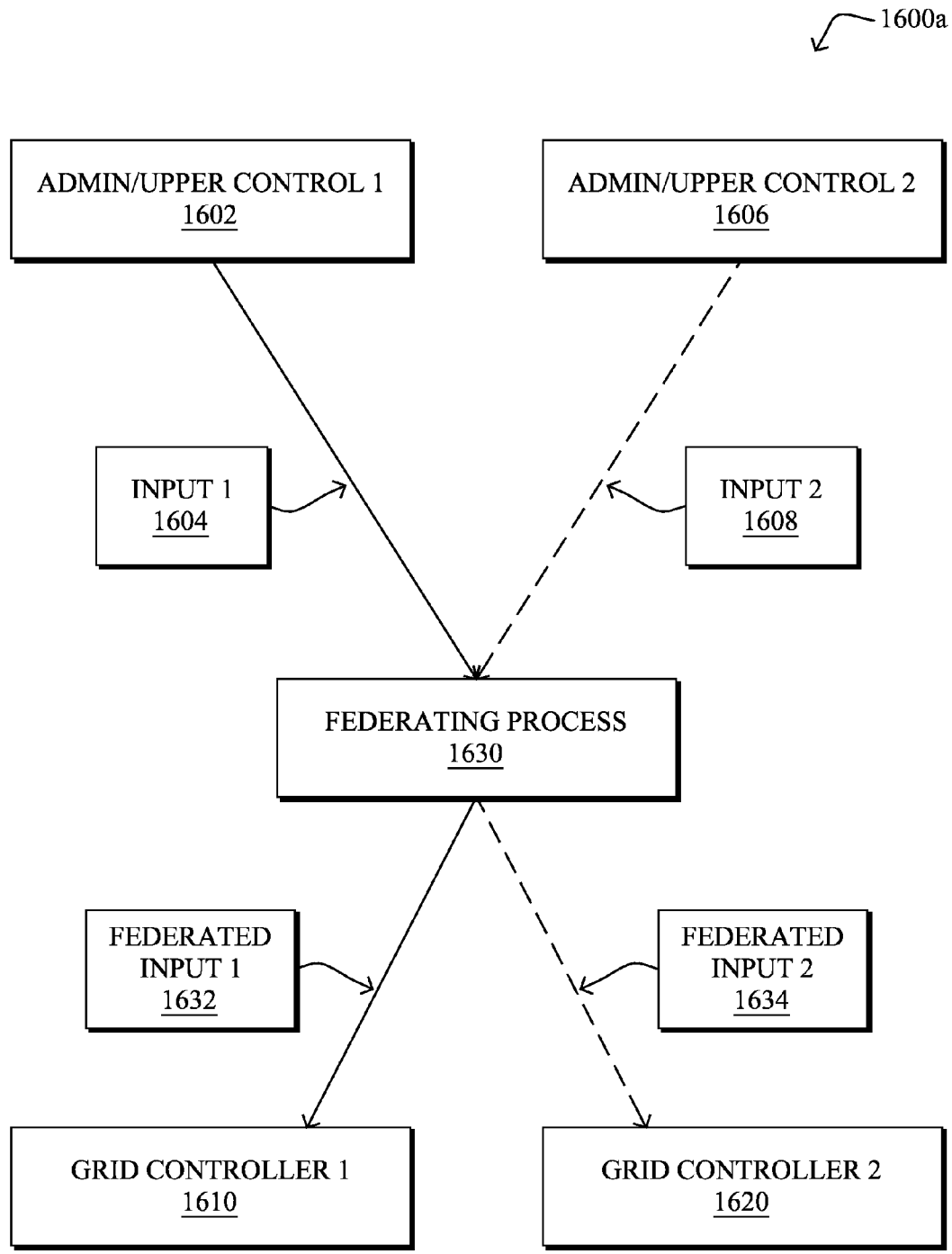
FIGS. 16A-16C illustrate examples of grid control federation through control of inputs, control commands, and/or feedbacks.

In particular, as shown in FIG. 16A, a first administration/upper control 1502 (e.g., a first control center) may produce a first input 1504 (e.g., a demand response) that may be routed/forwarded through the utility grid network to federating process 1530, which may then coordinate implementation of first input 1504 by federating first input 1504 into a first federated input 1532 and/or a second federated input 1534 that may then be routed/forwarded through the utility grid network to a first grid controller 1510 and/or a second grid controller 1520, respectively. In this manner, federating process 1530 may coordinate implementation of first input 1504 (e.g., a demand response) in the utility grid in an optimal manner, such as based on one or more complimentary and/or conflicting policies. Additionally, the techniques herein also provide that federating process 1530 may receive and coordinate (or resolve a conflict between) a first input 1504 (e.g., a demand response) from a first administration/upper control 1502 and a second input 1508 from a second administration/upper control 1506 (e.g., a second demand response, or a different type of input such as a fault/outage response). Federating process 1530 may federate the first input 1504 and the second input 1508 into a first federated input 1532 and/or a second federated input 1534, respectively. Federated input 1532 and/or federated input 1534 may then be routed/forwarded to a first grid controller 1510 and/or a second grid controller 1520. In other words, the techniques herein provide that one or more high level inputs from one or more administration/upper control level utility grid controllers/processes may be routed/forwarded through a utility grid network to a federation service that may change the one or more inputs (e.g., coordinate the one or more inputs, resolve conflicts between the one or more inputs, etc.) according to one or more rules or policies so as to produce one or more federated inputs that may be routed/forwarded through the utility grid network to produce an optimal result.

Figure 16B:
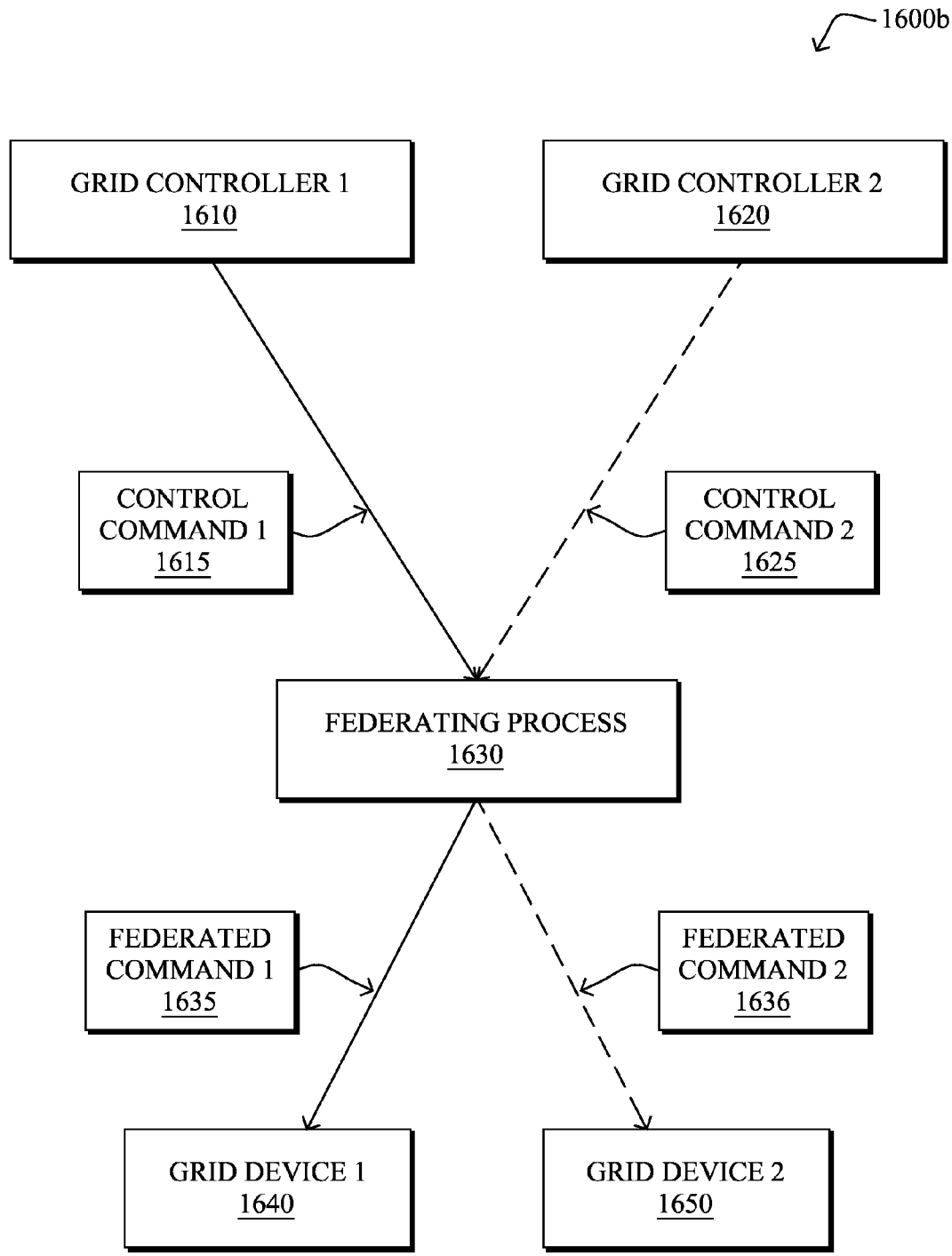

In another embodiment, as shown in FIG. 16B, the techniques herein allow coordination and/or conflict resolution between one or more control commands from one or more grid controllers. For example. a first grid controller 1510 (e.g., a voltage controller) may produce a first control command 1515 (e.g., reduce voltage) that may be routed/forwarded through the utility grid network to federating process 1530, which may then coordinate implementation of first input 1515 by federating first control command 1515 into a first federated control command 1535 and/or a second federated control command 1536 that may then be routed/forwarded through the utility grid network to a first grid device 1540 and/or a second grid device 1550. In this manner, federating process 1530 may coordinate implementation of first control command 1515 (e.g., a voltage reduction request) in the utility grid in an optimal manner, again based on one or more complimentary and/or conflicting policies. Additionally, the techniques herein also provide that federating process 1530 may receive and coordinate (or resolve a conflict between) a first control command 1515 (e.g., a voltage reduction request) from a first grid controller 1510 and a second control command 1525 from a second grid controller 1520 (e.g., a different voltage reduction request, or a voltage increase request). Federating process 1530 may federate the first control command 1515 and the second control command 1525 into a first federated control command 1535 and/or a second federated control command 1536, respectively. Federated control command 1535 and/or federated control command 1536 may then be routed/forwarded to a first grid device 1540 and/or a second grid device 1550. In other words, the techniques herein provide that one or more control commands from one or more grid controllers within the utility grid may be routed/forwarded through a utility grid network to a federation service that may change the one or more grid control commands (e.g., coordinate the one or more control commands, resolve conflicts between the one or more control commands, etc.) according to one or more rules or policies so as to produce one or more federated control commands that may be routed/forwarded through the utility grid network to one or more grid device to produce an optimal result for utility grid operations.

Figure 16C:
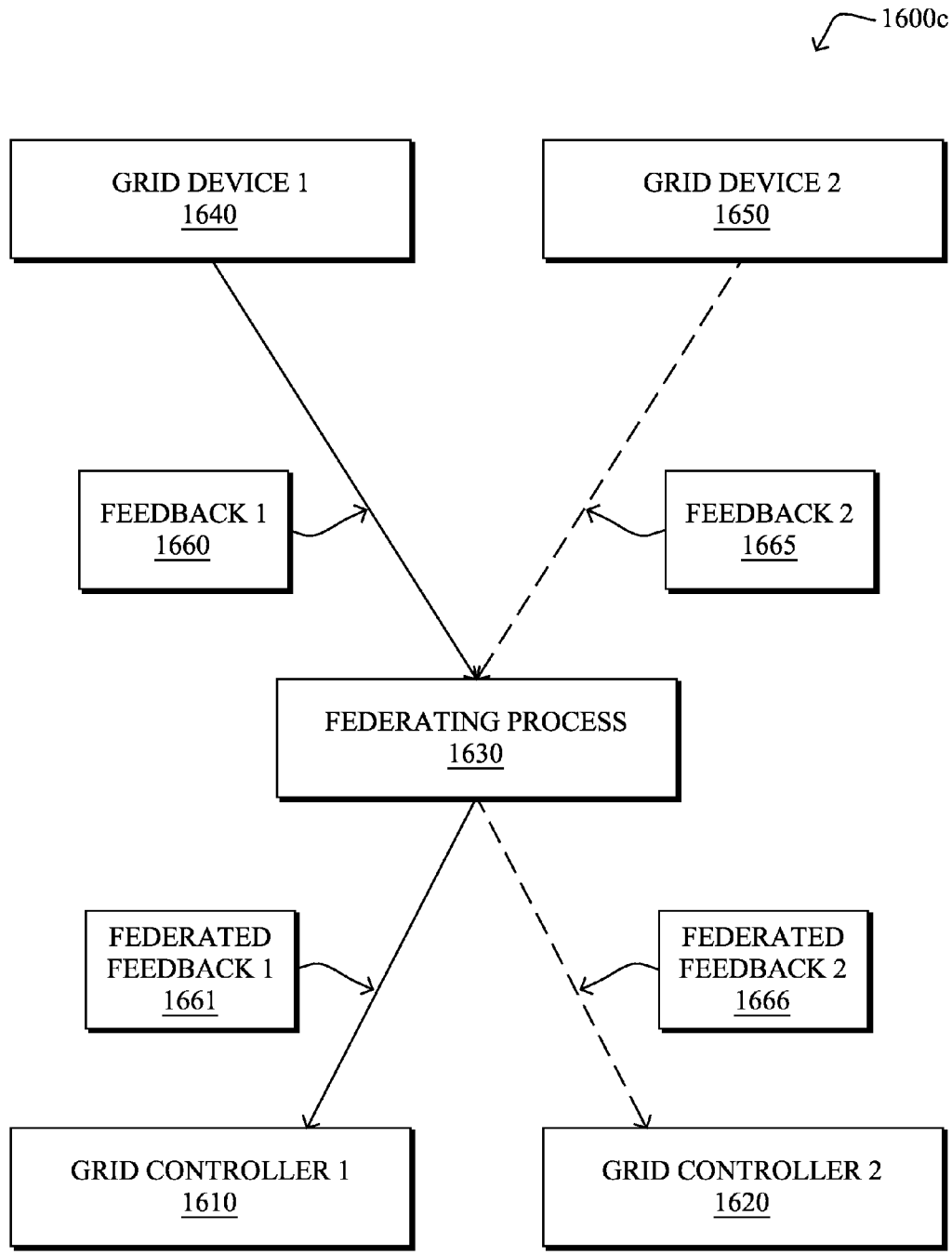

In yet another embodiment as shown in FIG. 16C, the techniques herein allow coordination between one or more feedbacks and/or adjustment of one or more feedbacks from one or more grid devices, particularly in order to manage interaction with grid controllers 1510/1520 expecting a different result than the federated control. For example. a first grid device 1540 (e.g., a voltage actuator) may produce a first feedback 1560 (e.g., voltage is 115V) that may be routed/forwarded through the utility grid network to federating process 1530. Federating process 1530 may then federate first feedback 1560 into a first federated feedback 1561, which may be routed/forwarded through the utility grid network to a first grid controller 1510. For example, if the first grid controller 1510 had requested a decreased voltage (e.g., 110V), yet the federating process (based on combined/conflicting policies and/or commands) decided to leave the voltage at the first grid device 1540 alone (e.g., 115V), the federated feedback to the first grid controller may falsely indicate the requested voltage (e.g., 110V) in order to avoid additional commands from the grid controller. Essentially, according to the techniques herein, feedback 1560 may be altered into federated feedback 1561 in order to allow a controller's feedback loop to converge to the desired result, even though the grid device has not performed exactly as the grid controller had requested. Also, as shown in FIG. 16C, one or more feedbacks (e.g., 1560 and 1565) from one or more respective grid devices may be federated (federated feedbacks 1561 and 1566, respectively) to achieve the desired feedback loop control (e.g., hiding the true result of the grid control operation from the controllers). Note that in architectures where the grid controllers are aware of and amenable to federation of their control commands, the federating process 1530 may inform the grid controllers of the federated command actually sent to the grid devices, and thus the grid controllers may be configured to accept the true feedback value (e.g., 115V in the example above).

Notably, while the embodiments shown in FIGS. 16A-16C illustrate independent federation techniques, it is important to note that any combination of federation may also be presented, such as federating i) inputs and controls, ii) inputs and feedbacks, iii) controls and feedbacks, or iv) inputs, controls, and feedbacks. In addition, such federation combinations need not be universally used within any given system. That is, in an example embodiment, the input to one grid controller may be altered, while a feedback to another may be altered, in order to achieve the desired result. In other words, depending upon devices in use, network connectivity, administrator implementation, etc., any given combination of federated/altered inputs, controls, and/or feedbacks may be used in order to federate the overall control design of a given grid architecture.

Figure 17A:
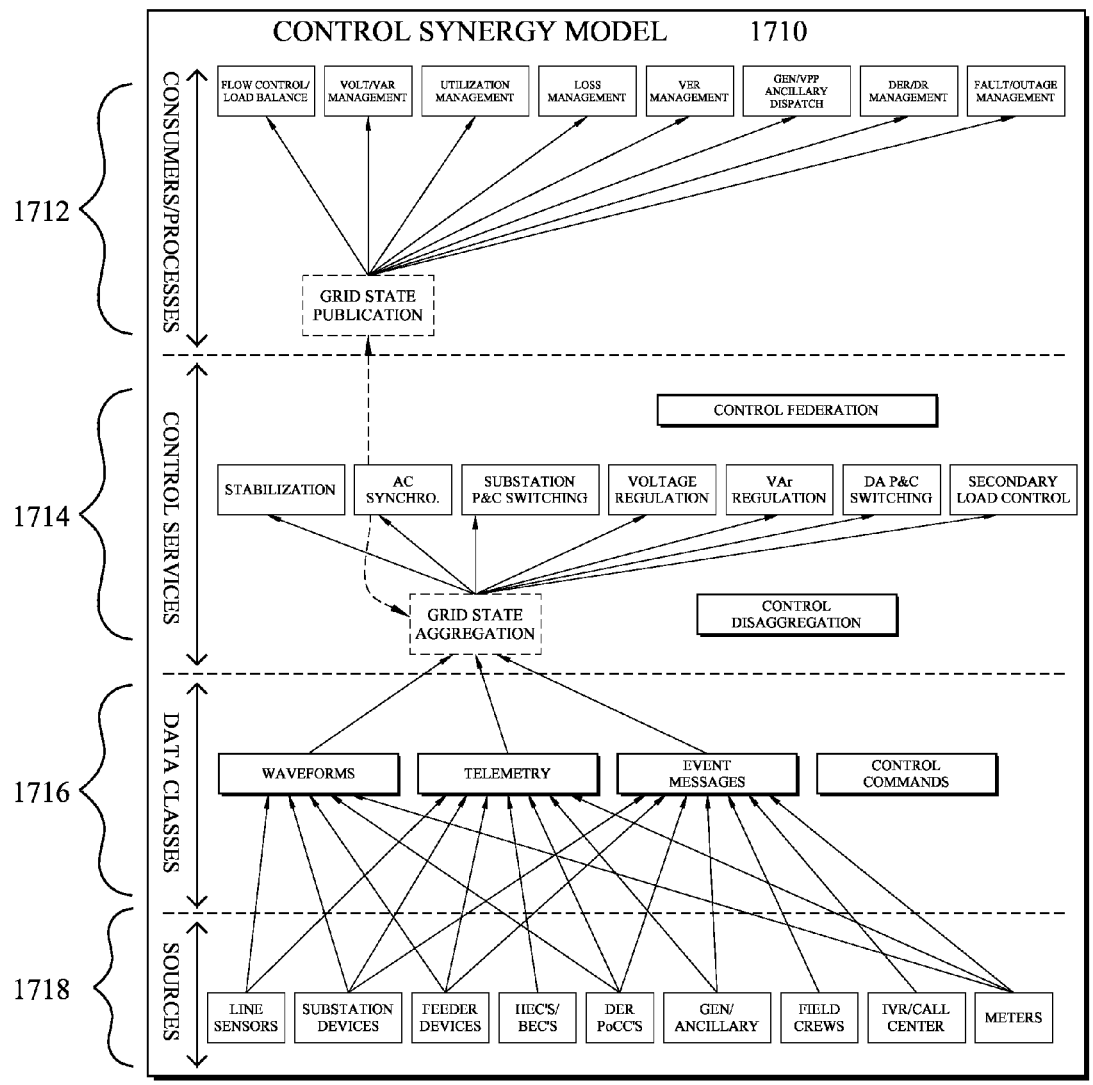
FIGS. 17A-17C illustrate an example control synergy map.
Figure 17B:
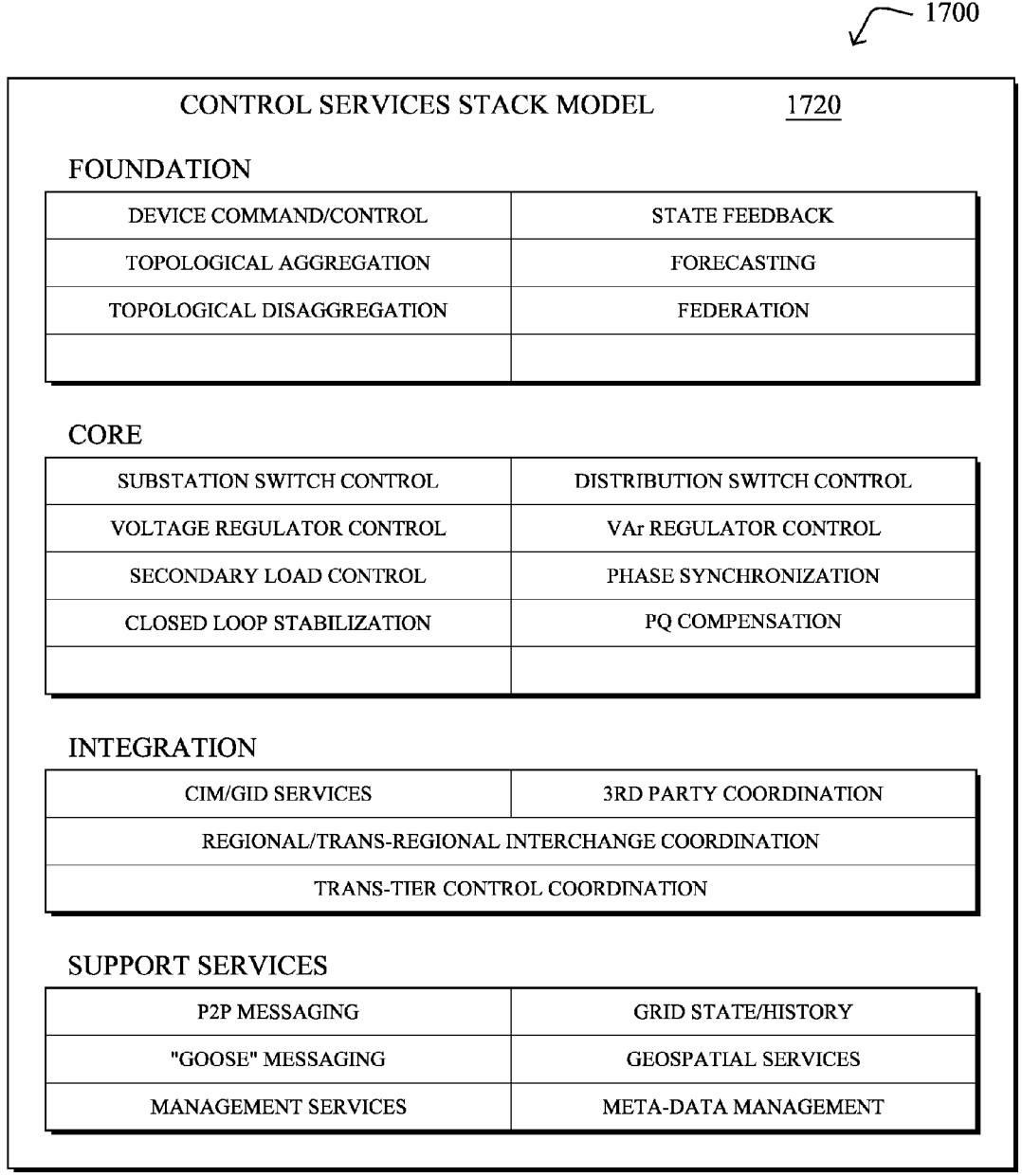
Figure 17C:
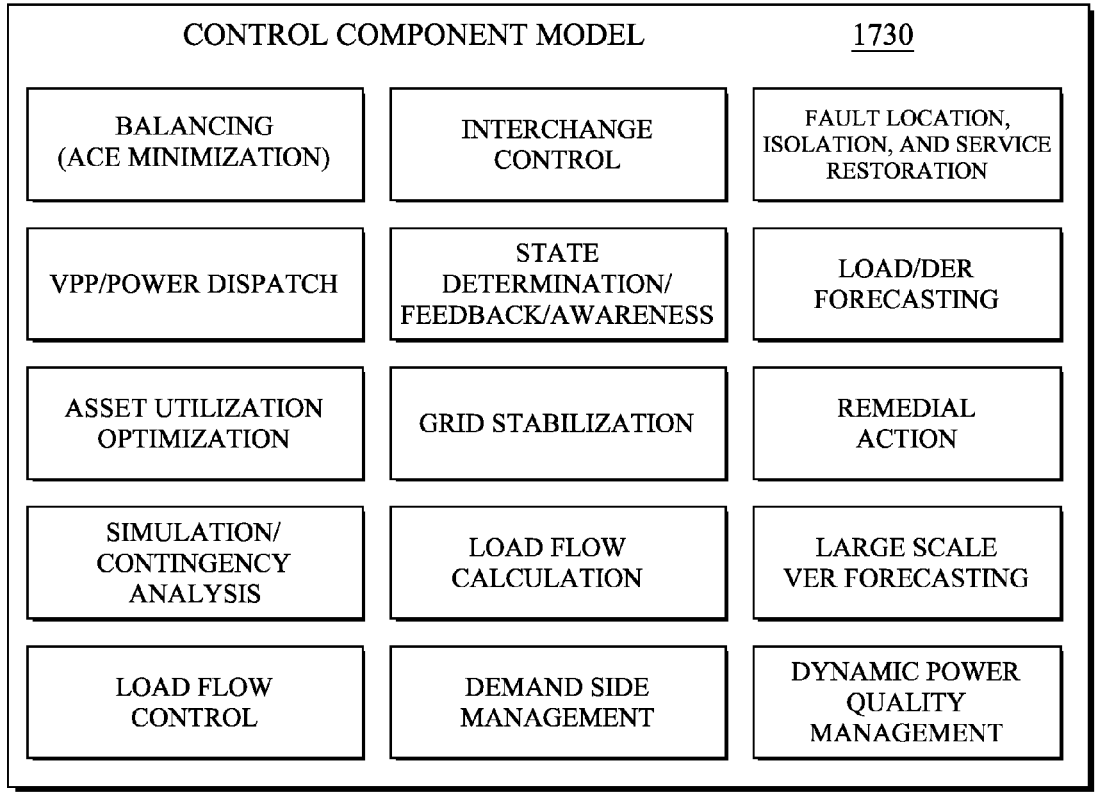

Illustratively, grid data sources and data classes may be mapped to control command function classes and represented as control synergy map 1700 as shown in FIGS. 17A-17C, which may comprise a synergy model 1710 (FIG. 17A), a services stack model 1720 (FIG. 17B), and a control component model 1730 (FIG. 17C). As shown in FIG. 17A, in particular, grid control federation may be provided as a control service 1714, and used to receive grid control commands from grid operation processes 1712 such as, for example, flow control/load balance processes, Volt/VAr management processes, utilization management processes, loss management processes, VER management processes, Gen/VPP/ancillary dispatch processes, DER/DR management processes, fault/outage management processes, and the like. Grid control federation service 1714 may then process grid control commands received from the various grid operation processes 1712, determine whether any conflicts are present, resolve any conflicts necessary, and parse the resolved commands on to control service processes 1714 such as, for example, grid stabilization, AC synchronization, substation P&C switching, voltage regulation, VAr regulation, DA P&C switching, secondary load control, etc.

As noted above, grid control operations increasingly involve multiple control objectives, possibly implemented via separate control systems, and grid control operation are evolving into a multi-controller, multi-objective (MC/MO) system in which many of the control systems want to operate the same actuators. The techniques herein may provide an important function to the smart grid by federating control systems such as, for example, Demand Response and DSM, voltage regulation, capacitor control, power flow control, Conservation Voltage Reduction (CVR), Electric Vehicle Charging Control, Line Loss Control, Load Balance Control, DSTATCOM and DER inverter VAr control, reliability event control, Virtual Power Plant (VPP) control, and meter connect/disconnect and usage restriction control.

The grid control federation techniques described above provide a set of policies/rules that allow two or more grid controller devices to resolve a control command conflict with one or more grid devices/systems/processes/functions in an optimal manner. Additionally, the techniques herein also provide grid control federation services that may be applied to legacy devices, which are generally not "smart," by using the network to redirect data flows to additional logic (e.g., a grid controller device) that resolves the federation conflicts according to rules specified by the grid control federation service. In other words, grid control federation combines two or more separate controls that affect the same physical device or grid parameter into a single coordinated control. This is especially useful in the situation where one or more of the controls is a legacy system that was not originally designed for such coordinated control. The grid control federation service platform may redirect data flows to bring the relevant data streams to a logic point (e.g., a grid controller device) where the necessary combination of logic and/or algorithms exist to perform the federation (e.g., the conflict resolution and/or coordination) of the control commands, and then route the outbound federated control command data flow as needed.

In other words, in situations where a legacy device(s) cannot act as part of the grid control federation service platform (e.g., it is not compatible), then a capable network device (e.g., a grid controller device) may be interconnected to the legacy device in order to "virtualize" the legacy device so that it may appear to have the advanced grid control federation service platform capabilities. That is, a network-capable device may be interconnected with the legacy device to allow communication on the network, while still providing legacy-type control to the non-network ready legacy device. For example, as shown in FIG. 16B, a second grid device 1550 may be a legacy grid device 1550 that is not able to communicate directly with either a first grid controller 1510 or a second grid controller 1520 over a computer network. However, federating process 1530 may allow "virtual" control of legacy grid device 1550 over the network by federating the first control command 1515 and/or the second control command 1525 from the first grid controller 1510 and/or the second grid controllers 1520, respectively, and then passing the federated control commands to legacy grid device 1550 as legacy control signals (e.g., to a signal input, rather than a network input). Similarly, as shown in FIG. 16C, federating process 1520 may also serve to "virtualize" feedback from a legacy device to a grid controller. For example, federating process 1530 may allow feedback from a legacy grid device 1550 to be routed/forwarded to a first grid controller 1510, which enables the grid controller to monitor and assess the current status of the legacy grid device 1550. Such device virtualization may also be used to add security and upgrade conformance interoperability and other standards to legacy devices until such a time as they can be upgraded directly.

Figure 18:
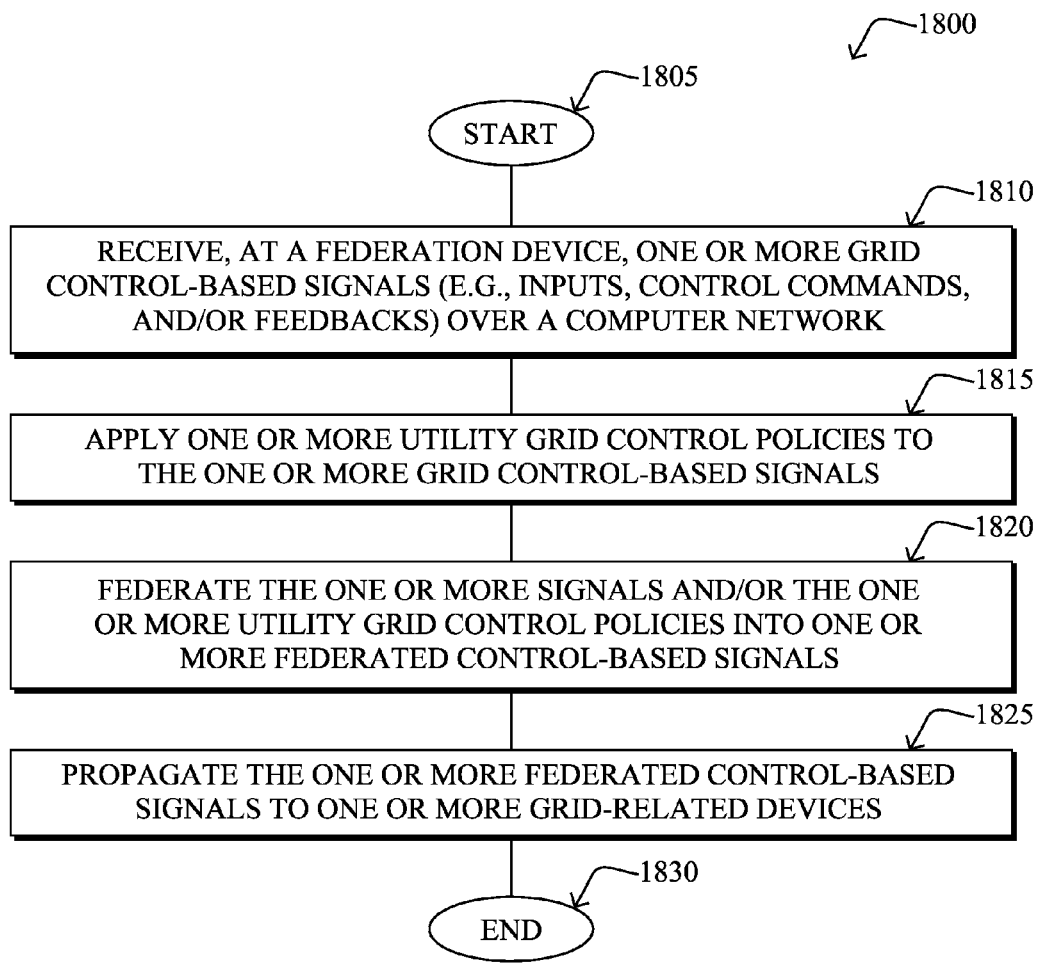
FIG. 18 illustrates an example simplified procedure for grid control federation.

FIG. 18 illustrates an example simplified procedure 1800 for grid control federation in accordance with one or more embodiments described herein. The procedure 1800 may start at step 1805, and continues to step 1810, where, as described in greater detail above, a federation device receives one or more grid control-based signals over a computer network. In step 1815, the federation device applies one or more utility grid control policies to the one or more grid control-based signals (e.g., inputs, control commands, and/or feedbacks as described above). In step 1820, the federation device federates the one or more control-based signals and/or the one or more utility grid control policies into one or more federated control-based signals, which are then propagated to one or more grid-related devices in step 1825. The simplified procedure 1800 may then illustratively end in step 1830, though notably with the option to return to any appropriate step described above based on the dynamicity of control command federation as detailed within the disclosure above.

It should be noted that while certain steps within procedure 1800 may be optional as described above, the steps shown in FIG. 18 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for control federation in utility grids. In particular, the techniques herein provides a set of policies/rules to mitigate conflicting control commands in an optimal manner. Particularly useful for legacy devices, which are not generally "smart," by using the network to redirect data flows (input, control, and/or feedback) to additional logic that resolves the federation conflicts according to rules specified by a grid control device or grid engineer.

Notably, a layered services architecture approach addresses complexity management for smart grids at scale, one of the most challenging smart grid design issues. Short term adoption of a layered services architecture allows for efficient transition to new control systems that are hybrids of distributed elements with centralized management. Later, as smart grid implementations approach full scale (in any given dimension), complexity management and the other smart grid architecture issues will benefit from a layered services architecture.

Said differently, now that communications and embedded processing capabilities are becoming available in forms that utility companies can use, a major obstacle in the adoption of distributed intelligence is that utility companies cannot make large changes in their systems in discrete steps. Rather they must go through transitions that can take years to complete. This is due to the nature of their mission and the financial realities utility companies face. In practice, utilities need to transition from centralized to distributed intelligence, and to operate in a complicated hybrid mode for long periods of time, perhaps permanently. This means that the utility service provider needs to be able to roll out distributed intelligence incrementally while maintaining full operations over the entire service area, and be able to modify the distributed architecture appropriately over time and geography. Simply having a distributed architecture implementation is not sufficient; it needs to be easily and continually mutable in terms of what functionality is distributed to which processing locations in the grid and be capable of coexisting with legacy control systems where they remain in place.

The present disclosure thus presents one or more specific features of a distributed intelligence platform that supports variable topology over both time and geography. The platform provides the mechanisms to locate, execute, and re-locate applications and network services onto available computing platforms that may exist in control and operations centers, substations, field network devices, field edge devices, data centers, monitoring centers, customer premises devices, mobile devices, and servers that may be located in power delivery chain entities external to the Transmission and Distribution utility. These techniques use a communication network as a future-proofed platform to incrementally and variably implement distributed intelligence and thereby achieve the associated benefits without being forced to make an untenable massive switchover or to use a single fixed architecture everywhere in its service area.

While there have been shown and described illustrative embodiments that provide for grid control federation, it is to be understood that various other adaptations and modifications may be made within the spirit and scope of the embodiments herein. For example, the embodiments have been shown and described herein with relation to electric grids. However, the embodiments in their broader sense are not as limited, and may, in fact, be used with other types of utility grids, such as gas, water, etc., or specific types of "smart" networks where appropriate. For example, in addition to utility grids, recent trends indicate that the future will progress towards sensor-actuator based automation in various sectors including buildings, communities/cities, transportation, energy, etc. Experts predict that in the coming decades there will be a fabric of trillions of sensor-actuator devices embedded into our surroundings. This fabric will bring about integrated automation that will greatly improve the efficiency of the environment/resources as well as the quality of living for the human and living being within the environment. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, at a federation device, grid control-based signals over a computer network that have been redirected to the federation device instead of one or more grid-related devices that control the flow of alternating current (AC) electrical power in a utility grid;
  applying, by the federation device, one or more utility grid control policies to the one or more grid control-based signals;

federating, by the federation device, conflicting grid control-based signals in the received grid control-based signals into one or more federated control-based signals by selecting a particular one of the conflicting grid control-based signals as the federated control-based signal based on the applied one or more utility grid control policies; and propagating, by the federation device, the one or more federated control-based signals to the one or more grid-related devices.

2. The method as in claim 1, wherein the one or more grid-control based signals comprise at least one of: an input signal, a grid control signal, or a feedback signal.

3. The method as in claim 1, wherein the one or more grid-control based signals comprise one or more feedback signals regarding control of the flow of AC electrical power in the utility grid.

4. The method as in claim 1, wherein the one or more grid-control based signals comprise one or more grid control signals.

5. The method as in claim 1, wherein propagating further comprises:
communicating the one or more federated control-based signals to the one or more grid-related devices over the computer network.

6. The method as in claim 1, wherein propagating further comprises:
communicating the one or more federated control-based signals directly to a signal input of the one or more grid-related devices.

7. The method as in claim 2, wherein the one or more grid-control based signals are input signals associated with at least one of: Flow Control, Load Balance, Volt/VAr management, Utilization Management, Loss Management, VER management, Gen/VPP/Ancillary Dispatch, DER/DR Management, or Fault/Outage Management.

8. The method as in claim 1, wherein federating further comprises:
determining whether any of the one or more grid control-based signals are conflicting grid control-based signals.

9. The method as in claim 1, wherein the one or more grid-related devices comprise at least one of: a control center, a substation, a feeder, a grid controller, a grid device, a grid sensor, or a grid actuator.

10. An apparatus, comprising:
one or more network interfaces to communicate with a utility grid network;
a processor coupled to the network interfaces and adapted to execute one or more processes; and
a memory configured to store a process executable by the processor, the process when executed operable to:
receive one or more grid control-based signals over a computer network that have been redirected to the apparatus instead of one or more grid-related devices that control the flow of alternating current (AC) electrical power in a utility grid;
apply one or more utility grid control policies to the one or more grid control-based signals;
federate conflicting grid control-based signals in the received grid control-based signals into one or more federated control-based signals by selecting a particular one of the conflicting grid control-based signals as the federated control-based signal based on the applied one or more utility grid control policies; and
propagate the one or more federated control-based signals to the one or more grid-related devices.

11. The apparatus as in claim 10, wherein the one or more grid-control based signals comprise at least one of: an input signal, a grid control signal, or a feedback signal.

12. The apparatus as in claim 10, wherein the one or more grid-control based signals comprise one or more feedback signals regarding control of the flow of AC electrical power in the utility grid.

13. The apparatus as in claim 10, wherein the one or more grid-control based signals comprise one or more grid control signals.

14. The apparatus as in claim 10, wherein the process, when executed to propagate, is further operable to:
communicate the one or more federated control-based signals to the one or more grid-related devices over the computer network.

15. The apparatus as in claim 10, wherein the process, when executed to propagate, is further operable to:
communicate the one or more federated control-based signals directly to a signal input of the one or more grid-related devices.

16. The apparatus as in claim 11, wherein the one or more grid-control based signals are input signals associated with at least one of: Flow Control, Load Balance, Volt/VAr management, Utilization Management, Loss Management, VER management, Gen/VPP/Ancillary Dispatch, DER/DR Management, and Fault/Outage Management.

17. The apparatus as in claim 10, wherein the process, when executed to federate, is further operable to:
determine whether any of the one or more grid control-based signals are conflicting grid control-based signals.

18. The apparatus as in claim 10 wherein the one or more grid-related devices comprise at least one of: a control center, a substation, a feeder, a grid controller, a grid device, a grid sensor, or a grid actuator.

19. A system, comprising:
a computer network;
one or more grid control devices;
one or more federation devices; and
one or more grid-related devices that control the flow of alternating current (AC) electrical power in a utility grid, wherein the one or more federation devices are configured to: receive one or more grid control-based signals from the one or more grid control devices over the computer network that have been redirected to the one or more federation devices instead of the one or more grid-related devices, apply one or more utility grid control policies to the one or more grid control-based signals, federate conflicting grid control-based signals in the received grid control-based signals into one or more federated control-based signals by selecting a particular one of the conflicting grid control-based signals as the federated control-based signal based on the applied one or more utility grid control policies, and propagate the one or more federated control-based signals to the one or more grid-related devices.

20. The system as in claim 19, wherein the one or more grid-control based signals comprise at least one of: an input signal, a grid control signal, or a feedback signal.

* * * * *

UNITED STATES PATENT AND TRADEMARK OFFICE
CERTIFICATE OF CORRECTION

| | | |
|---|---|---|
| PATENT NO. | : 9,099,868 B2 | Page 1 of 1 |
| APPLICATION NO. | : 13/484066 | |
| DATED | : August 4, 2015 | |
| INVENTOR(S) | : Jeffrey D. Taft | |

It is certified that error appears in the above-identified patent and that said Letters Patent is hereby corrected as shown below:

In the Specification

In column 9, line 5, please amend as follows:
nications to manage [[is]] secure data flows and to integrate

Signed and Sealed this
Nineteenth Day of January, 2016

Michelle K. Lee
*Director of the United States Patent and Trademark Office*